United States Patent
Gupta et al.

(10) Patent No.: US 12,331,603 B1
(45) Date of Patent: Jun. 17, 2025

(54) METHODS AND APPARATUS TO DECOUPLE DOWNHOLE TOOL SPEED FROM CONVEYANCE TOOLS

(71) Applicant: Halliburton Energy Services, Inc., Houston, TX (US)

(72) Inventors: Sudhir Gupta, Houston, TX (US); Edward Harrigan, Richmond, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/775,655

(22) Filed: Jul. 17, 2024

(51) Int. Cl.
*E21B 23/00* (2006.01)
*E21B 21/08* (2006.01)
*E21B 23/14* (2006.01)
*G01V 5/10* (2006.01)

(52) U.S. Cl.
CPC ............ *E21B 23/001* (2020.05); *E21B 21/08* (2013.01); *E21B 23/14* (2013.01); *G01V 5/102* (2013.01)

(58) Field of Classification Search
CPC ............................... E21B 23/001; E21B 23/14
See application file for complete search history.

(56) References Cited

U.S. PATENT DOCUMENTS

| | | | |
|---|---|---|---|
| 6,179,055 B1 * | 1/2001 | Sallwasser | E21B 23/00 175/96 |
| 6,910,533 B2 | 6/2005 | Guerrero | |
| 7,080,700 B2 | 7/2006 | Bloom et al. | |
| 7,156,192 B2 | 1/2007 | Guerrero et al. | |
| 7,172,026 B2 | 2/2007 | Misselbrook | |
| 7,185,714 B2 | 3/2007 | Doering et al. | |
| 7,273,108 B2 | 9/2007 | Misselbrook | |
| 7,334,642 B2 | 2/2008 | Doering et al. | |
| 7,343,982 B2 | 3/2008 | Mock et al. | |
| 7,392,859 B2 | 7/2008 | Mock et al. | |
| 7,516,782 B2 | 4/2009 | Sheiretov et al. | |
| 7,542,543 B2 | 6/2009 | Shampine et al. | |
| 7,607,478 B2 | 10/2009 | Martinez et al. | |
| 7,639,781 B2 | 12/2009 | Shampine et al. | |
| 7,647,980 B2 | 1/2010 | Corre | |

(Continued)

FOREIGN PATENT DOCUMENTS

| | | |
|---|---|---|
| BR | 102021011701 | 12/2022 |
| EP | 2505772 | 5/2013 |

(Continued)

OTHER PUBLICATIONS

Galvan, et al., "Pushing Coiled Tubing Design and Manufacturing Boundaries to Service50,000-ft Mega-Reach Wells in Abu Dhabi", SPE/ICoTA Well Intervention Conference and Exhibition held in The Woodlands, Texas, USA, Mar. 21-22, 2023., Mar. 2023, 17 pages.

(Continued)

*Primary Examiner* — David Carroll
(74) *Attorney, Agent, or Firm* — DeLizio, Peacock, Lewin & Guerra LLP

(57) ABSTRACT

Wellbore logging apparatus include a positioning mechanism that couples one or more well logging devices included in a well logging tool to a downhole tractor. The positioning tool allows the logging tools to be moved at a different rate of travel through a wellbore compared to the rate of travel of the downhole tractor through the wellbore.

20 Claims, 12 Drawing Sheets

(56) References Cited

U.S. PATENT DOCUMENTS

| | | |
|---|---|---|
| 7,770,667 B2 | 8/2010 | Moore |
| 7,837,427 B2 | 11/2010 | Beckel et al. |
| 7,874,366 B2 | 1/2011 | Allcorn et al. |
| 8,151,902 B2 | 4/2012 | Lynde et al. |
| 8,211,247 B2 | 7/2012 | Marya et al. |
| 8,220,541 B2 | 7/2012 | Martinez et al. |
| 8,220,554 B2 | 7/2012 | Jordan et al. |
| 8,245,796 B2 | 8/2012 | Mock |
| 8,302,682 B2 | 11/2012 | Mcinally |
| 8,353,336 B2 | 1/2013 | Neuhaus et al. |
| 8,522,869 B2 | 9/2013 | Noya |
| 8,576,090 B2 | 11/2013 | Lerche et al. |
| 8,602,115 B2 | 12/2013 | Aguirre et al. |
| 8,689,868 B2 | 4/2014 | Lerche et al. |
| 8,752,651 B2 | 6/2014 | Randall et al. |
| 8,770,261 B2 | 7/2014 | Marya |
| 8,770,303 B2 | 7/2014 | Aguirre et al. |
| 8,839,883 B2 | 9/2014 | Hay |
| 8,905,148 B2 | 12/2014 | Nelson et al. |
| 8,991,522 B2 | 3/2015 | Randall et al. |
| 9,004,194 B2 | 4/2015 | Eddison et al. |
| 9,027,657 B2 | 5/2015 | Varkey |
| 9,097,086 B2 | 8/2015 | Aldossary |
| 9,133,673 B2 | 9/2015 | Hill et al. |
| 9,157,287 B2 | 10/2015 | Slocum et al. |
| 9,368,260 B2 | 6/2016 | Varkey et al. |
| 9,412,492 B2 | 8/2016 | Varkey et al. |
| 9,500,058 B2 | 11/2016 | Tune et al. |
| 9,540,889 B2 | 1/2017 | Revellat et al. |
| 9,624,723 B2 | 4/2017 | Fraser |
| 9,624,743 B2 | 4/2017 | Al Dabbous |
| 9,685,891 B2 | 6/2017 | Feliu et al. |
| 9,708,867 B2 | 7/2017 | Lovell et al. |
| 9,850,724 B2 | 12/2017 | Foucher et al. |
| 9,863,198 B2 | 1/2018 | Mccormick |
| 9,874,061 B2 | 1/2018 | Bedrossian |
| 9,890,602 B2 | 2/2018 | Guttormsen et al. |
| 9,920,613 B2 | 3/2018 | Lee et al. |
| 9,976,351 B2 | 5/2018 | Randall |
| 10,030,485 B2 | 7/2018 | Gourmelon |
| 10,087,692 B2 | 10/2018 | Al Dabbous et al. |
| 10,227,825 B2 | 3/2019 | Randall |
| 10,260,299 B2 | 4/2019 | Randall |
| 10,309,205 B2 | 6/2019 | Randall |
| 10,316,616 B2 | 6/2019 | Stafford et al. |
| 10,683,719 B2 | 6/2020 | Motland |
| 10,883,325 B2 | 1/2021 | Ratcliffe et al. |
| 10,927,625 B2 | 2/2021 | Fleckenstein et al. |
| 10,927,925 B2 | 2/2021 | Armstrong |
| 10,954,769 B2 | 3/2021 | Randall et al. |
| 11,029,244 B1 | 6/2021 | Hangarter |
| 11,127,512 B2 | 9/2021 | Sangar et al. |
| 11,136,880 B1* | 10/2021 | McCormick ............ E21B 47/017 |
| 11,142,973 B2 | 10/2021 | Ssafwany et al. |
| 11,168,522 B2 | 11/2021 | Fuglestad |
| 11,248,427 B2 | 2/2022 | Mauchien et al. |
| 11,371,303 B2 | 6/2022 | Wai |
| 11,387,014 B2 | 7/2022 | Varkey et al. |
| 11,441,370 B2 | 9/2022 | Mcinally |
| 11,454,076 B2 | 9/2022 | Ludwig et al. |
| 11,466,525 B2 | 10/2022 | Wessel et al. |
| 11,499,372 B2 | 11/2022 | Qi et al. |
| 11,560,758 B2 | 1/2023 | Spinnangr |
| 11,624,250 B1 | 4/2023 | Randall et al. |
| 11,629,565 B1 | 4/2023 | Wai |
| 2003/0034177 A1 | 2/2003 | Chitwood et al. |
| 2005/0217861 A1* | 10/2005 | Misselbrook ............ E21B 23/14 166/381 |
| 2008/0066963 A1 | 3/2008 | Sheiretov et al. |
| 2008/0069307 A1 | 3/2008 | Shampine et al. |
| 2008/0073077 A1* | 3/2008 | Tunc ............ E21B 23/14 166/241.5 |
| 2008/0308318 A1* | 12/2008 | Moore ............ E21B 4/18 175/51 |
| 2008/0314639 A1* | 12/2008 | Kotsonis ............ E21B 4/18 175/51 |
| 2009/0151936 A1 | 6/2009 | Greenaway |
| 2009/0218105 A1* | 9/2009 | Hill ............ E21B 23/0411 166/241.1 |
| 2009/0229820 A1 | 9/2009 | Saeed |
| 2010/0126777 A1 | 5/2010 | Hallundbaek |
| 2011/0067889 A1 | 3/2011 | Marya et al. |
| 2011/0253393 A1 | 10/2011 | Vaidya et al. |
| 2012/0097419 A1 | 4/2012 | Varkey et al. |
| 2014/0014365 A1 | 1/2014 | Hallundbaek |
| 2014/0116729 A1 | 5/2014 | Al-Mulhem |
| 2014/0174762 A1 | 6/2014 | Macdougall et al. |
| 2015/0155073 A1 | 6/2015 | Varkey et al. |
| 2015/0167416 A1 | 6/2015 | Ludwig et al. |
| 2016/0237812 A1 | 8/2016 | Foucher et al. |
| 2016/0333653 A1 | 11/2016 | Bonderover et al. |
| 2017/0067318 A1 | 3/2017 | Haugland et al. |
| 2018/0202269 A1 | 7/2018 | Wensrich et al. |
| 2019/0040698 A1 | 2/2019 | Fuglestad |
| 2019/0153841 A1 | 5/2019 | Randall et al. |
| 2019/0316433 A1 | 10/2019 | Schroit et al. |
| 2019/0345785 A1 | 11/2019 | Fleckenstein et al. |
| 2019/0368290 A1 | 12/2019 | Vick et al. |
| 2019/0368331 A1* | 12/2019 | Vick, Jr. ............ E21B 23/10 |
| 2020/0123866 A1 | 4/2020 | Varkey |
| 2020/0157886 A1 | 5/2020 | Fuglestad |
| 2020/0332613 A1 | 10/2020 | Hussin |
| 2020/0399968 A1 | 12/2020 | Ludwig |
| 2020/0408074 A1 | 12/2020 | Yang |
| 2021/0189845 A1 | 6/2021 | Jabari et al. |
| 2021/0246745 A1 | 8/2021 | Mcinally |
| 2022/0025751 A1 | 1/2022 | Wensrich et al. |
| 2022/0049561 A1 | 2/2022 | Saeed |
| 2022/0065058 A1 | 3/2022 | Saeed et al. |
| 2022/0259933 A1 | 8/2022 | Wai et al. |
| 2022/0275708 A1 | 9/2022 | Borg |
| 2023/0014986 A1* | 1/2023 | Qi ............ E21B 23/001 |
| 2023/0020636 A1 | 1/2023 | Qi |

FOREIGN PATENT DOCUMENTS

| | | |
|---|---|---|
| EP | 2505765 | 11/2013 |
| EP | 2815061 | 12/2014 |
| EP | 2129864 | 1/2016 |
| EP | 3205813 | 8/2017 |
| GB | 2414499 | 11/2005 |
| GB | 2434819 | 8/2007 |
| NO | 20052085 | 10/2006 |
| NO | 20160042 | 7/2017 |
| NO | 20160278 | 8/2017 |
| NO | 20161606 | 4/2018 |
| NO | 345947 | 6/2020 |
| NO | 346285 | 5/2022 |
| WO | WO2009020397 | 2/2009 |
| WO | WO2019004834 | 1/2019 |
| WO | WO2019140287 | 7/2019 |
| WO | WO2019140336 | 7/2019 |
| WO | WO2020009692 | 1/2020 |
| WO | 2021225967 | 11/2021 |

OTHER PUBLICATIONS

Troup, et al., "Carbon Composite Technologies Combine with the Latest High PerformanceDownhole Tractor to Gather Production Data from Deeper than Ever Before, Logging 32 Compartments Over 25,000ft Horizontally to a Total Depth of40,600ft", SPE/ICoTA Well Intervention Conference and Exhibition held in The Woodlands, Texas, USA, Mar. 21-22, 2023., Mar. 2023, 17 pages.

"PCT Application No. PCT/US2024/039069 International Search Report and Written Opinion", Apr. 10, 2025, 12 pages.

* cited by examiner

METHODS AND APPARATUS TO DECOUPLE DOWNHOLE TOOL SPEED FROM CONVEYANCE TOOLS

TECHNICAL FIELD

The present disclosure relates generally to wellbore operations, and, more particularly, to various embodiments for modulating speed of downhole tools.

BACKGROUND

In wellbore systems and wellbore networks, downhole equipment is utilized in various downhole operations including, but not limited to, drilling operations, completion operations, wireline operations, logging operations, as well as other well operations. These wellbore operations are sometimes performed with the aid of a downhole tractor that is deployed within a wellbore. The downhole tractor may be used to move various types of loads and equipment, such as logging tools, along various portions of the wellbore, including portions of a wellbore that extend in a non-vertical orientation, or are oriented in an otherwise deviated direction. The downhole tractor may also be configured to pull a cable, such as an electrical supply and/or a data communication cable, along with the tractor through the wellbore. The pulled cable may be coupled to other devices located at the surface of the wellbore and/or to other devices located downhole in order to provide electrical power to the tractor and/or other devices located downhole, and to provide a communication link to/from the device(s) that may be positioned by movement of the tractor within the wellbore system.

BRIEF DESCRIPTION OF THE DRAWINGS

Embodiments of the disclosure may be better understood by referencing the accompanying drawings.

Figure 1:
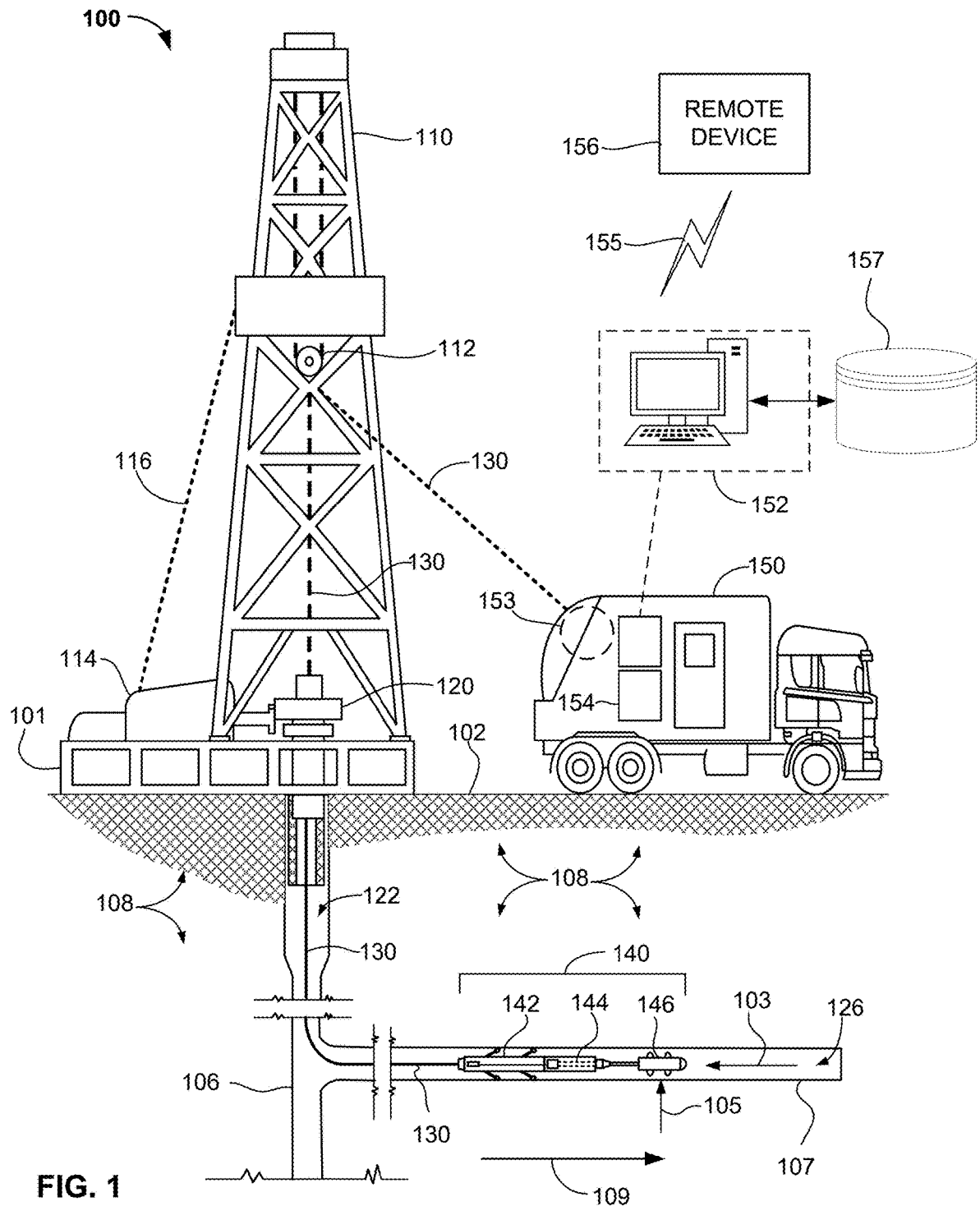
FIG. 1 illustrates a wellbore system including logging apparatus in accordance with various embodiments.

The drawings are provided for the purpose of illustrating example embodiments. The scope of the claims and of the disclosure are not necessarily limited to the systems, apparatus, methods, or techniques, or any arrangements thereof, as illustrated in these figures. In the drawings and description that follow, like parts are typically marked throughout the specification and drawings with the same or coordinated reference numerals. The drawing figures are not necessarily to scale. Certain features of the invention may be shown to be exaggerated in scale or in somewhat schematic form, and some details of conventional elements may not be shown in the interest of clarity and conciseness.

DETAILED DESCRIPTION

The description that follows includes example systems, methods, techniques, and program flows that embody aspects of the disclosure. The description includes example embodiments of downhole tractors configured to move various logging tools through wellbores, including non-vertically oriented wellbores, while using the logging tools to perform various well logging operations. In various embodiments, the downhole tractor has one or more pairs of extendible arms configured to extend outward in order to provide contact between one or more wheels positioned on each the arms and a casing of a wellbore. The wheels of the tractor are shaped so that when rotated by some device provided as part of the tractor, such as one or more electrical motors, the wheels engage the casing of the wellbore and thus allow the powered rotation of the wheels to provide propulsion of the tractor laterally though the casing. By controlling the rotational power and torque that is being provided to the wheels, the rate of speed of the tractor's movement laterally through the casing may be controlled, and in various embodiments is monitored by one or more sensors that provide feedback to the control device(s) being used to operate the wheels in order to maintain and control a desired rate of speed of the tractor laterally through the casing.

In various embodiments, there tractor itself, along with one or more logging tool and/or other devices the tractor may be coupled to and which are also being moved through the casing by the tractor, are electrically powered by an electrical power source, which may be located at the surface near the wellbore system where the tractor and logging tools are being deployed. A length of electrical cable may be used to couple the electrical power from the electrical power source to the tractor and the logging tools. As such, the tractor is also configured to pull the length of electrical cable along through the wellbore system as the tractor advances itself and the logging tools and other devices coupled to the tractor laterally through the wellbores. As the tractor and devices coupled to the tractor advance further with respect to depth into the wellbore, the length of cable required to make the connection between the power source and the tractor becomes longer, increasing the overall weight of the cable that the tractor must pull, along with overcoming any frictional forces associates with the cable's contact with other objects, such as wellbore casings that may be present along the route of the cable between the tractor and the electrical power source. For longer cable lengths, either a more powerful tractor may be required in order to operate the tractor at a desired rate of speed, or a slower rate of speed may be the maximum speed that a given tractor may be capable of operating at over a given range of well depths. Some factors that can limit power available for tractoring include:

Well profile, inclination, tortuosity
Well temperature
Cable length
Cable maximum voltage
Cable conductor and return electrical resistance
Cable weight in fluid
Maximum temperature limits of the cable
Cable coefficient of friction with casing
Tractor efficiency
Speed of the cable
Tool string weight in fluid
Coefficients of friction between tool string and casing
Power requirements of tools other than the tractor As such, when operating a tractored wireline tool in extended lateral wellbores the tractor speed is limited by a number of factors. However, some production logging tools are more optimally run at different speeds for measurement accuracy. For example, production logging spinners, which are used to measure rates of fluid flows within a wellbore passage, are optionally run in multiple passes at different speeds relative to the flowrate of the fluid in the wellbore. Spinners work best at high rates, where the effects of friction are minimized. In a further example, certain logging tools, for example, sonic logging tools and pulsed neutron logging tools, yield the best measurements at low logging speeds where enough data can be gathered for a given measurement. Therefore, in various wellbore logging operations it is beneficial and desirable to decouple the speed of logging tool relative to the position within the wellbore from the speed of the tractor or tractors being utilized to move and position the logging tool within the wellbore, at least for some interval or intervals of time, as the tractor moves continuously in a lateral direction through the wellbore.

In various embodiments as described herein, apparatus, systems, methods and techniques are disclosed that are configured to decouple the speed of movement of a logging tool positioned within a wellbore from the speed of movement of a tractor that is being utilized to position and to move the logging tool within the wellbore for at least some periods or intervals of time. In various embodiments, a linear actuator is positioned between the wireline tractor and the logging tool. Once positioned within a wellbore, the tractor may be operated at a constant speed or power level, while the speed and position of the linear actuator is controlled in order to, at least for some period of time, adjust the speed of the logging tool relative to the speed of the tractor in order to temporarily obtain a desired or more optimal logging speed for the logging tools relative to the formation and/or relative to a flow of fluid within the portion to the wellbore where the logging tool is located.

Embodiments as described herein provide improvements in the technical field of wellbore logging over existing well logging tools. The decoupling of the relative speeds of travel of the tractor versus the speed of the logging tool with the wellbore that is being conveyed by the tractor, for at least for some period of time, provides various advantages depending on the type of logging to be performed and the type of tool or tools being used to perform the logging operations, including but not limited to:

Maximizing the tractor speed reduces the overall time required to log portions or the extend of a wellbore.

Modulating logging tool speed allows for multiple spinner speeds to be logged, for example in a single pass through the wellbore, eliminating in some instances the need for multiple passes to be performed.

Controlling the measured logging tool speed eliminate the uncertainty of the logged measurements due to stick/slip.

When logging in an uphole direction by operating the tractor in reverse, the effect of the tools yo-yoing due to the stick/slip phenomenon can be mitigated with this arrangement, where the tractor maintains the top of the tool string at a constant speed and the actuator can make differential temporary adjustments to the speed of the tools relative to the speed of the tractor.

Reduce per needed from surface to run entire tool string at high speeds compared to running only a tool or part of a tool string at higher speeds.

It would be understood that embodiments of this disclosure may be practiced without all of the specific details as described herein. Further, while the wellbores as illustrated and described in the figures of this disclosure are shown as comprising a vertically oriented borehole and/or as a vertically oriented borehole coupled to a horizontally oriented borehole, embodiments of wellbores where the systems and methods as described in this disclosure may be deployed are not limited to wellbores having any particular orientation, and may include vertical, horizontal, and/or inclined wellbores, and combinations of these, including wellbore systems including one or more branches coupled to a main, a secondary, or other network(s) of a wellbore.

Unless otherwise specified, use of the terms "up," "upper," "upward," "uphole," "upstream," or other like terms shall be construed as generally away from the bottom, terminal end of a well; likewise, use of the terms "down," "lower," "downward," "downhole," or other like terms shall be construed as generally toward the bottom, terminal end of the well, regardless of the wellbore orientation. Use of any one or more of the foregoing terms shall not be construed as denoting positions along a perfectly vertical axis. In some instances, a part near the end of the well can be horizontal or even slightly directed upwards. Unless otherwise specified, use of the term "subterranean formation" shall be construed as encompassing both areas below exposed earth and areas below earth covered by water such as ocean or fresh water.

Throughout this disclosure the terms "proximal" and "distal" are used to refer to a particular end portions of a device or elements, such as a tubing or a borehole, which extend for some distance in a colinear or parallel direction relative to a longitudinal axis of the wellbore. The term "proximal" or "proximal end" refers to the end portion of the device or element that is closest to the wellhead of a wellbore when measured along the longitudinal axis of the wellbore and regardless of the actual distance from the wellhead. The term "distal" or "distal end" refers to the end portion of the device or element that is closest to the terminal end of a wellbore when measured along the longitudinal axis of the wellbore and regardless of the actual distance from the terminal end of the wellbore.

FIG. 1 illustrates a wellbore system ("system") 100 including logging apparatus 140 in accordance with various embodiments. As shown in FIG. 1, system 100 includes a derrick 110 positioned above a platform 101 resting on the surface 102 of formation 108. The derrick includes a hoist device 112 positioned within the derrick and configured to controllably lower and raise devices, such as logging tools, into and out, respectively, of the wellhead 120 of system 100. A hoisting device 114, such as an electrical motor or engine, may be used in conjunction with hoist cable 116 to perform the lowering and raising operations associated with hoist device 112.

As shown in FIG. 1, derrick 110 and wellhead 120 of system 100 are positioned above a wellbore 122 extending from surface 102 in a generally vertical direction into the formation 108. The wellbore 122 of system 100 continues in a generally vertical direction extending away from surface 102 for a distance, and includes a lateral wellbore 126 extending from wellbore 122 in a generally horizontal orientation. In various embodiments, some portions, or all of the wellbores shown in FIG. 1 for system 100, may be enclosed in a casing, such as casings 106 and 107. In various embodiments, portions of casing 106 and/or casing 107 include perforations that allow fluids, such as oil and/or gas, to pass from formation 108 into the casing(s) and be transported through the wellbores to surface 102, where the fluid(s) are captured for storage and/or for further processing.

As further illustrated in FIG. 1, a logging apparatus 140 is positioned within the lateral wellbore 126. In various embodiments, logging apparatus 140 includes a downhole tractor (tractor) 142 and a logging tool 146 mechanically coupled to the tractor 142 through an actuator 144. Tractor 142 may be configured to move the logging apparatus 140 in a lateral direction within the lateral wellbore 126, for example in a direction toward the distal or terminal end of the lateral wellbore, as indicated by arrow 109. As tractor 142 moves the logging apparatus 140 through the lateral wellbore 126, one or more logging devices included as part of the logging tool 146 may perform one or more logging operations associated with the wellbore. For example, the one or more logging devices may include spinners configured to measure a rate of fluid flow through the lateral wellbore 126 and passing by the logging apparatus 140. In further examples, the one or more logging devices may include sensing devices, such as sonic and/or pulsed neutron logging devices, which are configured to sense various characteristics associated with the casing 107, any cement associated with securing the casing 107, and/or the formation 108 located in the vicinity of the logging apparatus 140.

As further described below, actuator 144 is configured to couple the tractor 142 to the logging tool 146 in a manner that includes the capability to extend the logging tool 146 away from the tractor some distance and at some rate or rates of separation, and to then retract the logging tool 146 back toward the tractor 142 at some rate or rates of retraction. By performing the extensions and the retractions of the logging tool 146 while the tractor 142 remains moving relative to the overall position of the logging apparatus 140 within casing 107, the lateral speed of the logging tool 146 of the logging apparatus 140 may be varied and made to be different compared to the lateral speed of the tractor 142 as the tractor moves through lateral wellbore 126. This capability to have the logging tool 146 travel at a different rate of speed laterally through the wellbore 126 relative to the speed of the tractor 142, at least for some period of time based on extending or retracting the logging tool using the actuator 144, provides several advantages.

For example, logging tool 146 may include one or more spinners configured with sensors that are configured to measure a rate of fluid flow, illustratively represented in FIG. 1 by arrow 103, that is present in and may be flowing through lateral wellbore 126. As described above, the flow rate for a fluid present near a terminal end of a wellbore, such as lateral wellbore 126, may be slow or near zero. As such, the measured flow rate using the one or more spinners of logging tool 146 may be prone to inaccuracies. By moving the logging tool 146 in the direction of arrow 109 by the extension of the actuator 144, the relative rate to travel of the logging tool 146, and thus the one or more spinners moving in the direction of arrow 109, may be increased over that which is already being provided by the movement of the tractor 142. This increases the relative rate at which the fluid present in the lateral wellbore 126 moves past the logging tool 146 and the one or more spinners at least during the period of time when the logging tool is being extended by the movement of the actuator 144. The increase in the relative rate at which the fluid present in the lateral wellbore 126 moves past the one or more spinners of logging tool 146 provides an increase in the accuracy of the fluid flow rate measurements being provided by the or more spinners, even in instances where the actual flue flow rate of the fluid is low or near zero.

In some embodiments, it is beneficial to allow the logging tool to be moved through the wellbore at a speed that is slower relative to the formation and/or to the casing compared to the speed of movement of the tractor that is coupled to the logging tool. For example, when performing logging using a pulsed neutron logging tool, more data, and in some embodiments more accurate readings, may be gathered if the logging tool can be slowed and/or at least temporarily stopped in movement relative to the formation and/or to the casing within the wellbore where the logging tool is operating.

As an illustrative and non-limiting example, referring to FIG. 1, a logging apparatus 140 may be operated to move in a direction indicated by arrow 109 toward the distal or terminal end of lateral wellbore 126. Initially, the positioning mechanism of actuator 144 may be configured in the extended position, thereby placing the logging tool 146 at a distance away from tractor 142 that includes the added distance between the tractor 142 and logging tool 146 provided by the actuator 144 when in the extended configuration. As the tractor 142 continues to move in the direction indicated by arrow 109, for example at a constant rate, the positioning mechanism of actuator 144 is operated to retract, and in doing so moves the logging tool toward the tractor 142, at least for some interval of time, in some embodiments at a rate that matches the movement rate of the tractor, but in the opposite direction. This retraction of the positioning mechanism can be configured to allow the logging tool 146 to remain at a fixed position relative to the formation and/or the casing, for example at a point indicated by arrow 105 along lateral wellbore 126, at least for some period of time. The duration of the period of time that the logging tool may be maintained at fixed point indicated by arrow 105 may be determined by both the speed of the tractor 142 and the length of the stroke of the positioning mechanism of actuator 144. In various embodiments, the time period during which the logging tool may be maintained at the fixed position is in a range from 0 to 10 seconds, inclusive.

The above described illustrative examples relate to operations when the logging apparatus 140 is being operated to move "downhole" within a wellbore. A same type of operation, i.e., slowing or stopping the relative movement of the logging tool 146 relative to the formation and/or the case while the tractor continues to move in an "uphole" direction may be achieved by operating the positioning mechanism of actuator 144 initially from the retracted configuration, and then extending the positioning mechanism at a rate that matches the rate of movement of the tractor in the uphole direction for some period of time in order to maintain the logging tool 146 at a slowed rate of movement relative to the tractor, or at a fixed position relative to the formation and/or the casing for some period of time. By using these techniques as described above to slow or stop the relative movement of the logging tool relative to the formation and/or the casing for some period of time, the advantages of gathering more data points for a given location within the wellbore, and thus more accurate readings related to the formation and/or related to the casing or cementing of the casing, may be obtained.

In various embodiments, tractor 142 is coupled to a pulled cable 130, for example at the proximal or uphole facing portion of the tractor. As shown in FIG. 1, cable 130 extends from the tractor 142 back through lateral wellbore 126 and upward through a portion of vertical wellbore 122, through wellhead 120, and through derrick 110 to a cable station 150. In various embodiments cable station 150 is a mobile vehicle, such as a truck, as shown in FIG. 1. However, in various embodiments cable station 150 may be a permanent structure, such as a shed or a building, located above surface 102. In various embodiments cable station 150 includes a spool 153 or other mechanism that is configured to store a length of cable 130, and allow portions of the length of cable 130 to be feed out from the cable station 150 and into the wellbores 122 and 126 as tractor 142 pulls the cable 130 further into the wellbore system. Spool 153 may also be configured to retrieve lengths of cable 130 for example when tractor 142 is operated to move the logging apparatus 140 in an "uphole" direction within lateral wellbore 126 and/or when the logging apparatus 140 is being retrieved back to the surface through wellbore 122.

In addition to controlling the feed out and/or the retrieval of cable 130 within the wellbore system, cable station 150 may provide additional functions to support the logging operations being performed by logging apparatus 140. In various embodiments, cable station 150 includes a power supply 154, which may be an electrical power supply, and which is configured to supply electrical power through cable 130 to the logging apparatus 140 for the operation of the tractor 142, actuator 144, and/or the logging tool 146. In various embodiments, cable station 150 includes a computer system 152 configured to communicate with the logging apparatus 140 through cable 130. In various embodiments, computer system 152 is configured to receive data, such as sensor data and/or other logging data, which has been generated by the operation of the logging apparatus 140 within the wellbore system. In various embodiments, computer system 152 is configured as a user interface that allow programming instructions to be provided from computer system 152 and communicated to the logging apparatus 140 in order to control the operation of the logging apparatus 140 and/or to request data from the logging apparatus.

Computer system 152 may include one or more computer processors, one or more memory devices, and one or more input/output devices, such as but not limited to a computer keyboard, computer mouse, display monitor which may also function as a touch screen, and all of which allow a user, such as an engineer or field technician, to interact with the logging apparatus 140 and the computer system 152 in order to access logging data generated by the system and/or to control the overall operation of the system. In various embodiments, computer system 152 is coupled to a database 157, wherein database 157 may be configured to store operating instructions and parameters used to control the operation of the logging apparatus 140 and/or for storing the logging data generated by the operation of the logging apparatus 140. In various embodiments, computer system 152 may be located on site near the wellbores where the logging operations are being performed, and may be communicatively coupled to one or more remote devices 156, which may be located off site, as illustratively represented by lightning bolt 155 in FIG. 1. In various embodiments, computer system 152 may include any of the devices, and may be configured to provide any of the features and to perform any combination of the functions described herein and/or associated with computer system 800 of FIG. 8.

Although illustrated in FIG. 1 as having a single vertical wellbore 122 and a single lateral wellbore 126, embodiments of system 100 may include any number of wellbores, and any configuration of connected wellbores, including one or more lateral wellbores that are oriented at some non-vertical orientation(s) and/or some non-horizontal orientation(s) relative to surface 102. In addition, as shown in FIG. 1 as being a terrestrial based system, system 100 may include a wellbore system that extends through a body of water, such as a lake or an ocean, for some portion of the cased wellbore system.

The combination of tractor speed with actuator speed temporarily allows for higher logging speeds than would otherwise be possible with just a tractor, providing more accurate flowrate measurements. This will allow for obtaining accurate flowrate measurements in extended reach wells where the tractor speed is reduced due to the cable drag. Tractor speed moving at a constant speed, while actuator speed is constant in both the extension and retraction directions, resulting in two different logging speeds, the first logging speed during the extension of the actuator, and the second during the retraction of the logging tool.

Variations with respect to control of the speed of the tractor compared to the control and pattern of the speed of the logging tool include but are not limited to:

The tractor moving at a constant speed, while the positioning mechanism speed is modulated in a continuous sinusoidal pattern.

The tractor moving at a constant speed, while the positioning mechanism speed is ramping.

The tractor moving at a constant speed, which the positioning mechanism is moving in multiple steps, each step at a different speed.

Modulating the tractor speed synchronously with the actuator speed to obtain some other profile in tool speed relative to the fluid flow rate and/or relative to the formation.

As the tractor conveys the tool string within the wellbore, typically toward the "toe" of the lateral wellbore, the actuator oscillates from a retracted to and extended state. The actuator typically have a stroke length of about 1 foot, and can move at a speed in either direction of 0-60 Feet/minute. The tractor typically has a lateral speed of 0-60 Feet/minute. In some extended lateral wellbores power limitations may reduce the maximum tractor speed to 20-40 Feet/minute. In some embodiments, such as but not limited to shallow wells, the tractor may run at speeds up to 120 feet per minute.

This presents a challenge as some production logging tools operate optimally at different logging speeds. For example, spinners, which measure fluid flow velocity are less accurate at low well flowrates and low tractor speeds. This is because of friction between the spinners and their bearings or bushings. Flowrates in lateral wells drops to near zero near the distal end of the lateral due to decreasing flow contribution from fewer perforations. For this reason, it is preferable to operate the tractor at a high speed near the distal end of the lateral to maximize the differential speed between the flow velocity and the spinners. It is also common to make multiple passes in the well at different tractoring speeds to "calibrate" the spinners. By modulating the speed of the tools while conveying continuously, it may be possible to get an entire log with multiple speeds in a single pass.

In pulsed neutron logging, statistical gamma ray returns are gathered as detectors pick up scattering returns from neutrons which have been transmitted into the formation. Higher fidelity measurements can be achieved when logging at low speeds where more returns can be detected. However, this is inconsistent with the desirable property of tractoring or logging at a constant high speed to minimize operational time. By temporarily adjusting the speed of the tool string relative to the tractor, more accurate point measurements can be made a desirable intervals. In wireline conveyed logging, depth uncertainty due to stick/slip phenomenon caused by long elastic cable can distort logs and images. Using this technique, the depth uncertainty from cable stretch can be eliminated.

Embodiments of logging apparatus as described herein use an electromechanical linear actuator with an electromechanical wheeled tractor with software to accurately modulate logging tool position in the well while conveying the tools on the tractor. Software is used to reconstruct logs with accurate depth and production log results. Software can be used to correct for the offset in depth caused by the changing position of the actuator. Production logs are run on tractors today, typically the number of passes are made at different tractor speeds, when pull up on the cable, repeat, etc. Pulsed Neutron logs are typically run at very slow conveyance speeds, either logging down on tractor or logging up on cable. Acoustic logs are also typically run in cased holes at slow logging speeds in order to obtain high image resolutions.

Embodiments as described herein combine an extendible and retractable positioning mechanism and the tractor to control the logging speed of logging tools that are physically coupled to the positioning tool at a different speed of movement compared to the rate of movement of the tractor.

Figure 2A:
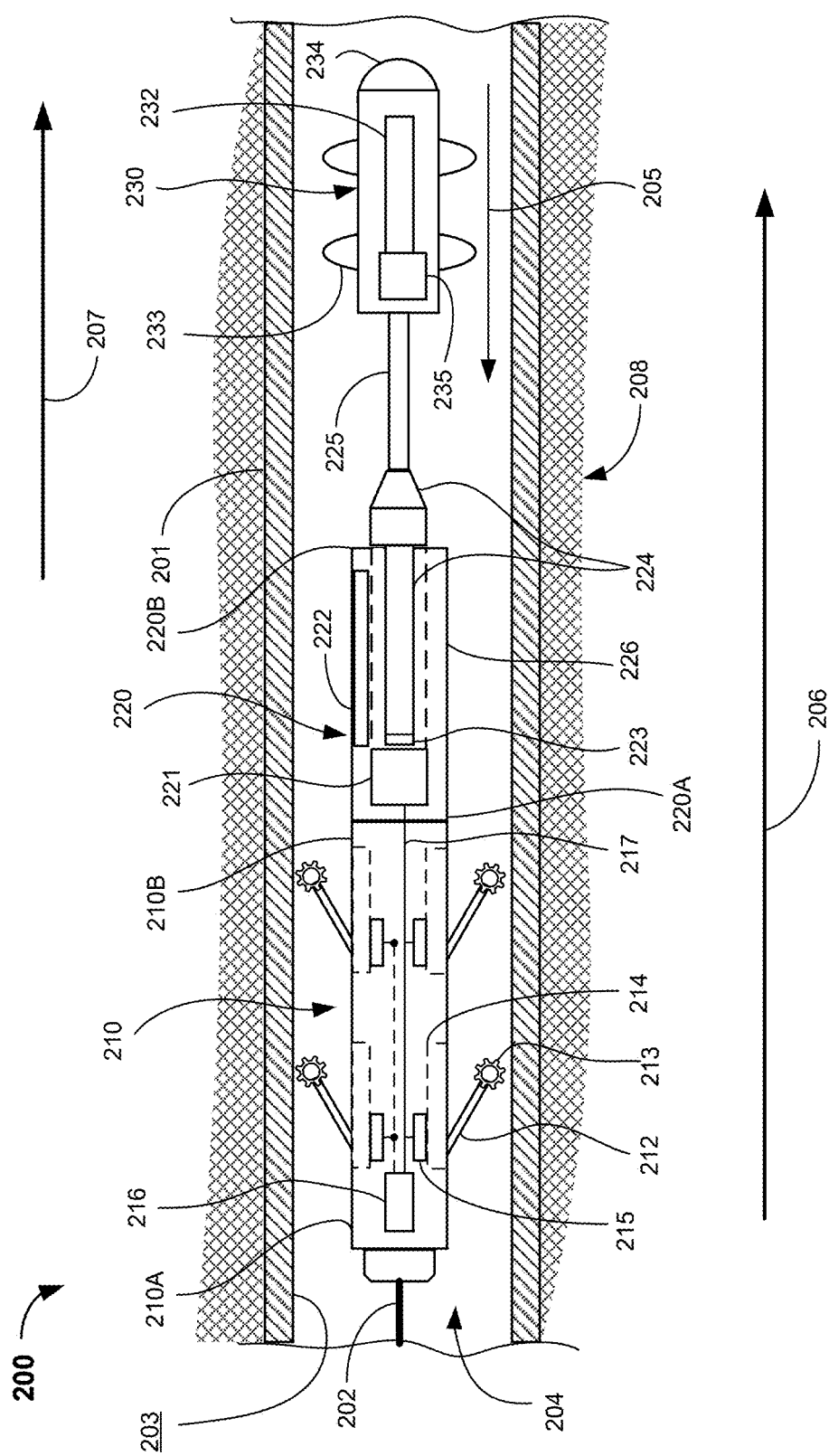
FIG. 2A illustrates a logging apparatus positioned within a wellbore in accordance with various embodiments.

FIG. 2A illustrates a logging apparatus 200 positioned within a wellbore in accordance with various embodiments. Logging apparatus 200 may be an embodiment of logging apparatus 140 as illustrated and described above with respect to FIG. 1, and may be configured to provide any combination of the features and to perform any combination of the functions described above with respect to logging apparatus 140 and system 100.

As shown in FIG. 2A, logging apparatus 200 is positioned within the annulus 204 of a wellbore casing 201 that extends through a portion of formation 208. Embodiments of logging apparatus 200 include a wellbore tractor 210, a positioning tool 220, and a logging tool 230. Tractor 210 is coupled to attachment cable 202 at a proximal end 210A of the tractor, wherein attachment cable 202 is secured to the proximal end of the tractor to allow the attachment cable to be drawn along the longitudinal axis of the wellbore and annulus 204 as the tractor is operated to move through the annulus 204, for example in the direction indicted by arrow 206. Attachment cable 202 is configured to provide various functionality to the logging apparatus 200, including providing electrical power to the logging apparatus and/or to provide a communication link between the logging apparatus and one or more other devices that may be communicatively coupled to attachment cable 202, such as data communication between logging apparatus 200 (FIG. 2A) and computer system 152 (FIG. 1).

As arranged in FIG. 2A, distal end 210B of tractor 210 is physically coupled to the proximal end 220A of the housing 226 of positioning tool 220. As such, the housing 226 of positioning tool 220 moves relative to casing 201 whenever and in a same direction of any movement as tractor 210 relative to casing 201. Positioning tool 220 includes a positioning mechanism 224. Positioning mechanism 224 is movably coupled to the housing 226 to allow the positioning mechanism to extend for some distance away and outward from the positioning tool 220 and in a direction away from the distal end 210B of the positioning tool, and to retract back into the housing 226 when extended to some extent out from the housing. Embodiments of positioning tool 220 include a controller 221 configured to control the movements of the positioning mechanism 224 relative to the housing 226 of the positioning tool 220. In various embodiments, the positioning mechanism 224 is extended and retracted relative to the housing 226 using a hydraulic system, such as using a hydraulicly actuated piston or piston and valving system (not specifically shown in FIG. 2A). In various embodiments, positioning mechanism 224 is configured to be controllable extended and retracted relative to housing 226 of the positioning tool 220 using an electrically powered and controlled system, such as by utilization of a stepper motor or a servo motor.

In various embodiments, the positioning tool 220 includes a position sensor 222, which may comprise an array of sensors and that are configured to sense the position of the positioning mechanism 224 relative to the housing 226 of the positioning tool 220. In various embodiments, a position marker 223, such as a magnetic element, may be included as part of the positioning mechanism 224, wherein the position marker is detectable by the position sensor 222, and may be configured to provide signals to controller 221 regarding the position of the positioning mechanism 224 relative to the housing 226 of the positioning tool. In various embodiments, controller 221 is configured to control the operation of the positioning mechanism 224 by controlling the operation of one or more actuation devices such as hydraulic pumps and valving and/or electrical motors, and may utilize signals provided by sensor 222 as feedback to further control the operations of the positioning mechanism 224.

As shown in FIG. 2A, logging tool 230 is mechanically coupled to the positioning mechanism 224 of the positioning tool 220 by tool coupler 225. Tool coupler 225 in some embodiments is configured as a rigid element, such as solid or tubular shaped element configured to secure the logging tool 230 to the logging apparatus 200, but allowing the positioning mechanism 224 to move the position of the logging tool 230 relative to the tractor 210 in unison with movements of the positioning mechanism relative to the positioning tool housing 226. By virtue of the physical coupling of the logging tool 230 being mechanically coupled to the positioning tool 220 through the tool coupler 225, movement of the logging apparatus 200 relative to the casing 201 as provided by tractor 210 may also be imparted to the logging tool 230 to the extent these movements are not counteracted by movements of the positioning mechanism 224, as further described below.

Embodiments of logging tool 230 include one or more logging devices 232 that are configured to perform logging operations and/or provide data related to casing 201, formation 208, and/or characteristics related to any fluids present within annulus 204 in the vicinity of the logging tool. For example, in various embodiments logging tool 230 includes one or more sensor devices, such as one or more spinners, which are configured to measure a rate of flow fluids, illustratively represented by arrow 205, which are flowing past the logging tool 230 in a direction toward tractor 210. The flow of fluid in various embodiments is a flow of production fluid, such as oil and/or gas, which are entering casing 201 and flowing toward the surface of the wellbore due to nature pressure present in the formation and/or based on a pressure artificially generated within the portion of the wellbore were logging apparatus 200 is located. Embodiments of logging tool 230 may include one or more centralizers 233 and/or and end cap 234 configured to guide and to protect the logging tool as the logging tool is advanced through the casing 201.

In various embodiments, logging device 232 may include devices that may be used to provide logging of the condition of the casing 201 and/or of the formation 208 in the vicinity of the location of the logging tool 230 within the wellbore. For example, logging devices 232 may include transmitting and receiving devices configure to transmit some type of signal(s), such as sonic or pulsed neutron signals, into the casing 201 and/or into formation 208, and to receive reflected and/or transmitted signals that return to the logging devices 232, and which may be then processed to determine one or more characteristics related to the condition of the casing 201 and/or the condition of some portion of the formation 208. Conditions related to casing 201 may include but are not limited to the condition of a cement layer (not shown in FIG. 2A) used to enclose and secure the casing 201 in place. Conditions related to formation 208 may include characteristics such as porosity, permeability, and/or the composition of the formation material in the vicinity of the logging tool 230 at the time the logging operations are being performed.

In various embodiments, operating logging apparatus 200 includes having the tractor arms 212 extended outward from recesses 214 so that the traction wheels 213 are in contact with the inner surface 203 of the casing of the wellbore. The drive mechanism of the traction wheels 213 is operated in order to turn the wheels in such a way and under controlled parameters so that the tractor is advanced along the longitudinal axis of the wellbore at a first and consistent rate of speed relative to the casing. In various embodiments, tractor 210 includes a controller 216 that is configured to control one or more devices, and arm actuator 215 to control the extension and retraction of the tractor arms 212 and the operations of devices, such as electric motor(s) utilized to drive the traction wheels 213 used to propel the tractor and the logging tool through the wellbore. Controller 216 may be configured to perform additional function not related to the propulsion of tractor 210, such as but not limited to providing communication of data between the logging tool 230, the positioning tool 220, for example using communications link 217, and/or one or more computer devices located remotely from the logging tool, such as computer system 152 (FIG. 1).

Referring again to FIG. 2A, in various embodiments and while operating the tractor 210 so that the tractor is advanced at a first and consistent rate of speed through the wellbore, the positioning tool 220 is also initially moved through the casing at the same speed as the tractor due to the fixed and physical coupling between the tractor and the positioning tool. In addition, due to the physical coupling between the positioning tool 220 and the logging tool 230, the logging tool is also initially moved through the casing at the same speed as the tractor 210 and the positioning tool 220.

Assuming there is a flow of one or more fluids (oil, gas, water, and/or some combination of these and/or other fluids that are present within the anulus within the casing), the rate of the flow of fluids (which in some embodiments may be a rate of zero flow relative to the casing) and for example is in a direction that that is opposite the direction of travel of the tractor/positioning tool/logging tool apparatus, one or more sensor, such as spinners, may be configured to sense the rate of fluid flow passing by the logging tool 230. This rate of flow of the fluid passing by the logging tool 230, once determined, is compensated for the rate of motion of the tractor/positioning tool/logging tool relative to the casing 201. As described, the direction of the movement of the logging apparatus 200 in a direction opposite the direction of the fluid flow within the casing in effect provides an increase in the rate of the fluid flow that is flowing past the logging tool due to the added motion the logging apparatus 200. However, this additional rate of fluid flow past the logging tool may not be of a magnitude that is desirable in order to increase the accuracy of the measurement of the rate of the fluid flow past the logging tool despite the added movement contributed by the motion of the tractor/actuator/logging tool apparatus.

In order to provide an even greater rate of fluid flow past the logging tool, and thus past the spinners, for at least some period of time, the positioning tool may be operated to extend the actuator coupling mechanism 224 to move the coupling mechanism 225 and the logging tool 230 in a direction away from the tractor and in a same direction as the movement to the tractor relative to the casing, as illustratively represented by arrow 207, while maintaining the first and consistent speed of the tractor through the casing. The result of extending the tool coupler 225 is that during the time the coupling mechanism is being extended, the speed of the movement of the logging tool 230, which is physically coupled to the coupling mechanism, is increased relative to the casing 201 and relative to the speed of movement of the tractor 210 by a rate determined by the rate of extension of the coupling mechanism.

As such, during the time of extending the tool coupler 225 the overall speed of the logging tool 230 relative to the casing 201 and therefore also relative to the rate of the fluid flow through the annulus of the casing is increased, at least for the duration of time when the positioning mechanism 224 is being extended in a direction away from the housing 226. This increase in the relative speed of the flow of fluid past the logging tool allows for higher spinner speeds, and therefore more accurate sensing of the speed of the fluid flow by the spinners. In various embodiments one the positioning mechanism 224 has reached the fully extended position, the operation of the positioning mechanism 224 can be reversed to retract the positioning mechanism backward toward the housing 226 of the positioning tool 220. Once retracted, the positioning mechanism 224 may again be operated to extend away from the housing 226, thereby providing another cycle of the interval of time during which the rate of the flow of fluid past the logging tool 230, and thus past the spinners, is increased.

A controller 235 located in the logging tool 230 may be configured receive and/or process the signals generated by the spinners related to the rate of fluid flows past the spinners, and communicate this information to the controller 221 locate in the positioning tool 220. Controller 221 may receive the data provided by controller 235, and synchronize the data with the time interval during which the positioning mechanism 224 was being extended. By synchronizing the data collected by the spinner with the time intervals when the logging tool 230 was being accelerated in the downhole direction by the extension of the positioning mechanism 224, the spinner data representing the fluid flow rates can be recalibrated to remove the effect of the added motion of the logging tool provided by the extensions of the positioning mechanism. The recalibrated spinner data may then be communicated to controller 216 located in the tractor, wherein controller 216 may again recalibrate the spinner data to adjust the fluid flow rates measured by the spinners based on the rate of movement to the tractor 210 relative to the casing 201. Utilizing these technique, the spinners may be operated at least over some time intervals to provide more accurate fluid flow measurement data while allowing for compensation for the relative movements of the different parts of the logging apparatus 200 to determine the actual rate of the fluid flow represented by arrow 205 occurring within the portion of the casing 201 where the logging operations were performed. In various embodiments, the fluid flow data may be communicated from controller 216 to one or more remote computing devices, such as computer system 152, using cable 202, which may occur in real time. In various embodiments, the data related to the logging operations may be stored for example in controller 216, and recovered at a later time, for example after the logging tool 200 has performed any logging operation and then has been retrieved from the wellbore.

In various embodiments of logging apparatus 200, the one or more logging devices 232 included in logging tool 230 may comprise transmitter/receiver devices, such as sonic logging tools and/or pulsed neutron logging tool, which are configured to emit some type of signal which is transmitted through and/or reflected back from the fluid within casing 201, the casing 201 itself, cement surrounding the casing 201, and/or the material forming the formation 208 that surrounds the casing. Any signal received back as a result of the transmitted signal, and/or a lack of received signals, may be sensed by one or more receiver devices included in the logging device 232, and processed to generate data related to the fluid flows present within the casing 201, the condition of the casing 201 and/or any cement surround the casing, and/or characteristics associated with formation 208.

In various embodiments, when operating these signal based logging tools within a wellbore it may be advantageous to slow or stop the movement of the logging tool, at least for some interval of time, so that more data points and more accurate data may be collected for any given position within the wellbore. However, in normal operation the tractor 210 of the logging apparatus 200 is operated at a constant rate of speed of movement through the wellbore, and thus would normally also move the tooling tool 230 through the wellbore at this same constant rate of speed, which may not be optimal for the logging operations using the transmitting/receiving type logging tools. By using the configuration of the logging apparatus 200, the speed of the logging device 232 may be slowed, or in some embodiments even stopped, for at least some interval of time relative to the speed of movement of the tractor through the wellbore, as further described below with respect to FIG. 2B.

Figure 2B:
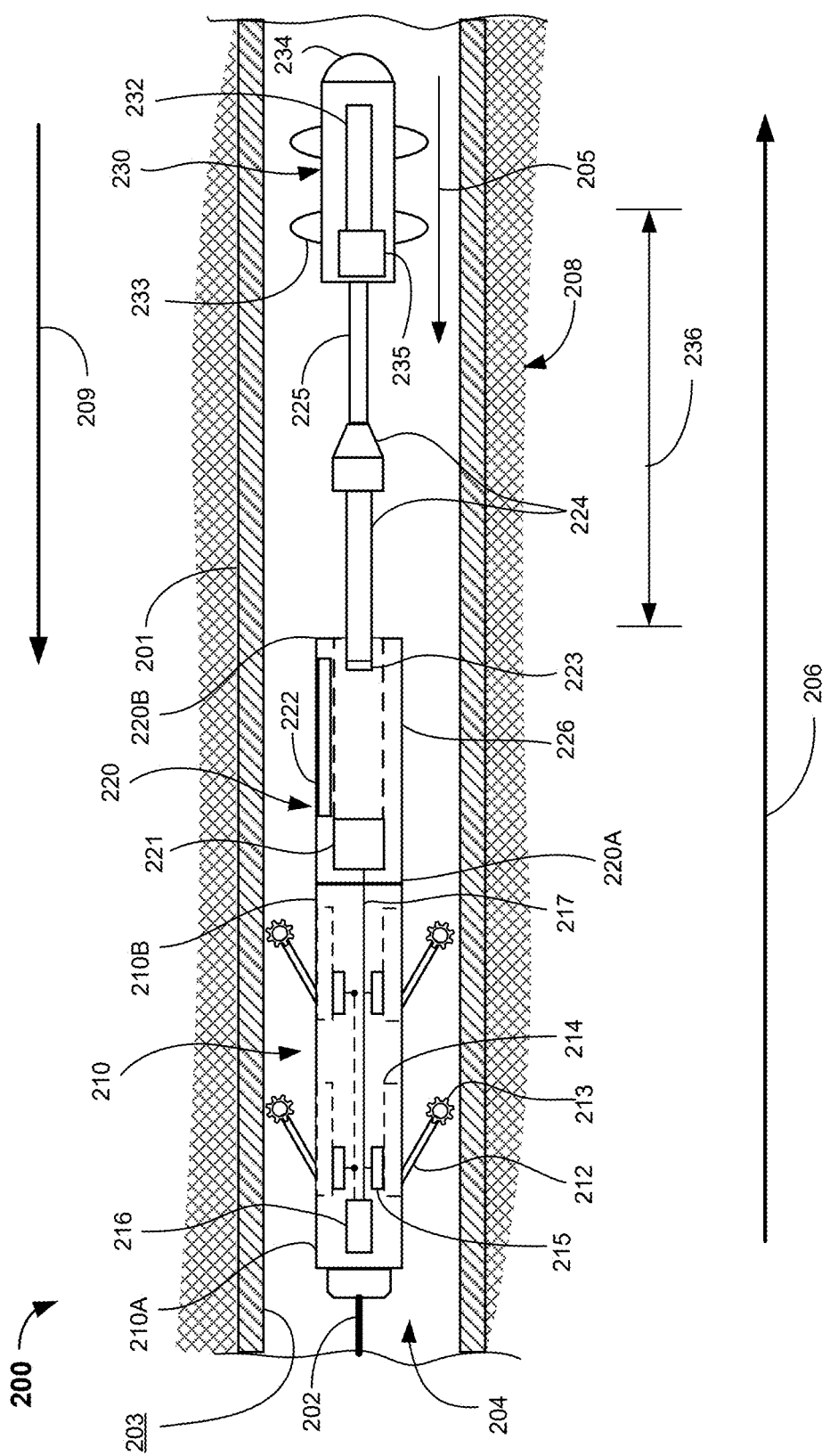
FIG. 2B illustrates the logging apparatus of FIG. 2A positioned within a wellbore in an extended configuration in accordance with various embodiments.

FIG. 2B illustrates the logging apparatus 200 of FIG. 2A positioned within a wellbore, and in the extended configuration in accordance with various embodiments. As shown in FIG. 2B, positioning mechanism 224 has been actuated to an extended configuration wherein the positioning mechanism is moved outward longitudinally away from the distal end 220B of the positioning tool 220, and having most of shaft 227 extending outside of the housing 226. The extended configuration of the positioning mechanism 224 also positions the logging tool 230, which is coupled to the positioning mechanism 224 by the tool coupler 225, at a distance that is further away from the housing 226 of the positioning tool 220 compared to the distance between the logging tool 230 and the position of the logging tool 230 provided when the positioning mechanism 224 is in a retracted configuration and the shaft 227 is fully received within the housing 226.

Beginning from the extended configuration as shown in FIG. 2B, the logging apparatus 200 including the tractor 210, positioning tool 220, and the logging tool 230, may be propelled by tractor 210 through the wellbore, for example at some constant rate of speed, in the direction as illustratively represented by arrow 206. As logging apparatus 200 is moved through the casing 201, the positioning tool 220 may operate to begin to retract the positioning mechanism 224 so that the shaft 227 is drawn back into housing 226 of the positioning tool 220. The retraction of shaft 227 results in the movement of tool coupler 225 and the logging tool 230 to be retracted backward in the direction of the positioning tool 220 in a direction as illustratively represented by arrow 209, so that a distance 236 between the distal end 220B and the logging tool 230, including logging devices 232, is reduced at some rate of retraction.

During this retraction process, one or more logging operations, including but not limited to the transmission of signal from and the receiving of signals back at one or more of the logging devices 232, may be performed as the distance 236 is reduced at the rate of retraction. Because the direction of the retraction (illustratively represented by arrow 209) is in a direction that is opposite of the direction of movement of the logging apparatus 200, (as illustratively represented by arrow 206), the result is that the logging tool 230 and the logging device 232 can be moving at a rate of movement in the direction of arrow 206 and relative to casing 201 at a rate that is less than the rate of movement of the tractor 210 at least for the time interval while the shaft 227 and the positioning mechanism 224 are being retracted. In some embodiments, the rate of the speed of the retraction may be great enough to match the speed of the tractor 210, but in the direction opposite the direction of movement of the tractor, and thereby effectively stopping the movement of the logging tool 230 and the one or more logging devices 232 relative to the casing 201 over at least the time interval when the retraction of the positioning mechanism is occurring.

By providing this feature of being able to slow down, or in some instants stop, the movement of the logging devices relative to the casing for at least a time interval, more data points and potentially more accurate logging data may be collected by logging devices 232. This data can be synchronized to the time periods and the rate(s) of retraction performed by the positioning mechanism 242 during which these retraction cycle occurs in order to calibrate the collected data to the correct positions within the casing 201 of the wellbore where these logging operations were performed.

Figure 2C:
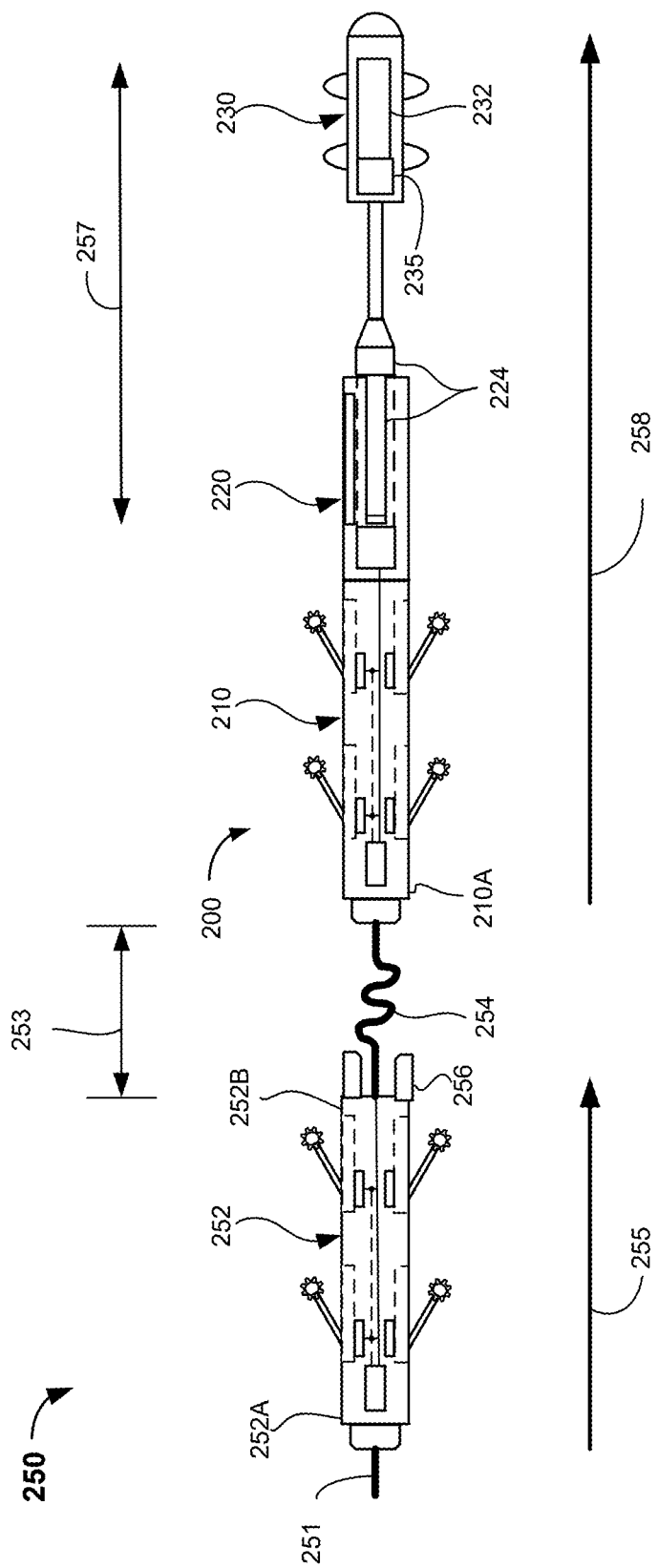
FIG. 2C illustrates a logging apparatus that includes two tractors in accordance with various embodiments.

FIG. 2C illustrates a logging apparatus 250 that includes two downhole tractors in accordance with various embodiments. Logging apparatus 250 is configured to be positioned in a casing of a wellbore (casing not specifically shown in FIG. 2C for clarity purposes), and comprising a logging apparatus 200 arrange with tractor 210, positioning tool 220, and logging tool 230, similar to or the same as illustrated and describe above with respect to FIGS. 2A and 2B. Logging apparatus 200 may be configured to provide any of the features and to perform any of the functions as described above with respect to logging apparatus 200 and FIGS. 2A and 2B, with differences as further described below.

As shown in FIG. 2C, logging apparatus 250 includes an "uphole" tractor 252 that is coupled to a cable 251 at proximal end 252A, and coupled to an umbilical cord 254 at distal end 252B. Umbilical cord 254 is also coupled to the proximal end 210A of logging apparatus 200. Cable 251 may be configured to provide electrical power for the operation of tractor 252, and also provide power, in conjunction with umbilical cord 254, to operate the devices of logging apparatus 200, including tractor 210. Umbilical cord 254 may be configured to communicate data generated by the logging devices 232 of logging tool 230 through umbilical cord 254, and through tractor 252 through cable 251 to one or more computer devices, such as computer system 152 (located remotely) from logging apparatus 250.

In operation, the uphole tractor 252 may be configured to pull cable 251 along through a wellbore casing at a first speed, illustratively represented by arrow 255. The "downhole" tractor 210 may be configured to operate to move the logging apparatus 200 through the wellbore case at a speed, illustratively represented by arrow 258, which may be different from the speed of movement of tractor 252, in some embodiments for at least some interval of time. Umbilical cord 254 is configured to be coiled and/or extendible and retractable in order to allow a distance 253 between tractor 252 and tractor 210 to be varied over time while maintaining the power and/or data communication link between tractor 252 and the logging apparatus 200.

In one embodiment, the rate of speed of movement of tractor 210 is an increased rate of speed of movement compared to a rate of movement of tractor 252 in order to increase a relative rate of a flow of a fluid past the logging devices 232 included in the wellbore where the logging tool 230 is operating in order to provide more accurate measurements of the fluid flow rates within the wellbore. In another embodiment, the speed of movement of tractor 210 is decreased or even temporarily stopped relative to the rate of speed of movement of tractor 252 in order to reduce the rate of movement of the logging devices 232 included in logging tool 230 relative to the casing where the logging tool is performing the logging operation(s), thus allowing the logging devices 232 to gather more data points and/or to provide more accurate data readings for the portion(s) of the wellbore where the logging apparatus 200 is performing the logging operations.

In various embodiments, positioning tool 220 is configured to provide extension and retraction operations relative to positioning mechanism 224 and logging tool 230, illustratively represented by arrow 257, in order to further enhance and supplement the variations in the speed of movement of the logging tool 230 relative to the speed of movement provided by tractor 210 and relative to the speed of movement of uphole tractor 252. In various embodiments, the range of distance 253 extends from 0 to 10 feet, inclusive.

In various embodiments, a releasable latching mechanism 256 could be used to couple the two tractors mechanically for rig up, conveyance in the vertical hole, and/or logging out on cable 251, which can be released once logging apparatus 250 is positioned within a portion of a wellbore where the logging operations are to be performed.

Figure 2D:
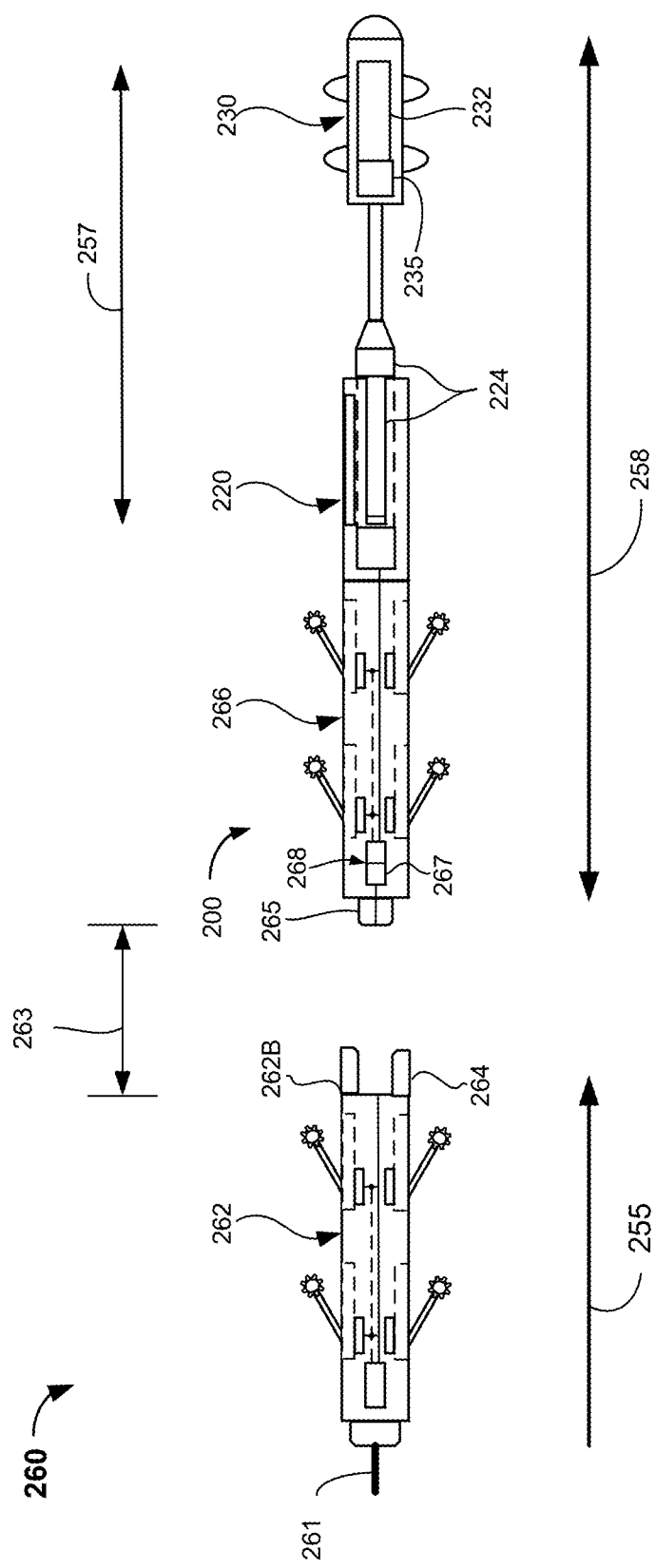
FIG. 2D illustrates another logging apparatus that includes two tractors in accordance with various embodiments.

FIG. 2D illustrates another logging apparatus 260 that includes two downhole tractors in accordance with various embodiments. Embodiments of logging apparatus 260 include the two tractor apparatus the same as or similar to the logging apparatus as illustrated and described above with respect to logging apparatus 250 (FIG. 2C), including an uphole tractor 262 and a logging apparatus 200 that includes tractor 266, with further differences as further described below.

In various embodiments of logging apparatus 260, there is no umbilical cord used to couple tractor 262 with logging apparatus 200. Instead, tractor 266 of logging apparatus 200 may be powered at times from a battery 267 that is incorporated into the tractor 266, and which may be controlled by a battery management system 268. Power provided by battery 267 under the control of battery management system 268 may be used to operate the devices needed to propel the tractor 266 and logging apparatus 200 through a wellbore, to power the operation of the positioning tool 220, and to power the operation of the logging tool 230, including the one or more logging devices 232 included in the logging tool.

In various embodiments, tractor 262 is configured to pull cable 261 through the wellbore, at time independently of the movements of logging apparatus 200, and wherein power for the operation of tractor 262 may be provided to tractor 262 through cable 261. In various embodiments, tractor 262 includes a latching mechanism 264, for example at the distal end 262B of the tractor, which allows for mechanical coupling to tractor 266. In various embodiments, when coupled together, power that is provided by cable 261 may be coupled though tractor 262 to power the operation of any of the devices included in logging apparatus 200, including use for recharging the battery 267 included in tractor 266.

By not using a cord or other physical connection between tractor 262 and logging apparatus 200 at least at some times, the logging apparatus 200 may be operated at different speeds of movement through the wellbore, as illustratively represented by arrow 258, compared to the rate(s) of speed of operation of the uphole tractor 262. As such, the range of distances 263 that may be achieved between the tractors, and the time these tractors may be operated independently without being latched together, can be much greater than may be possible with the logging apparatus 250 as illustrated and described above with respect to FIG. 2C. In addition to the independent operation of logging apparatus 200 of logging apparatus 260 as illustrated in FIG. 2D, by usings the extension and retraction capabilities of the positioning tool 220 coupling tractor 266 with the logging tool 230, further variations with respect to the relative speed of movements, as illustratively represented by arrow 257, may be achieved, thereby adding to the capability of the logging apparatus 260 to provide the advantages of logging using the logging device 232 as described throughout this disclosure based on controlling the speed of movements of the logging devices relative to fluid flow rates and relative to a casing of wellbore where the logging operations are being peerfomred.

Figure 2E:
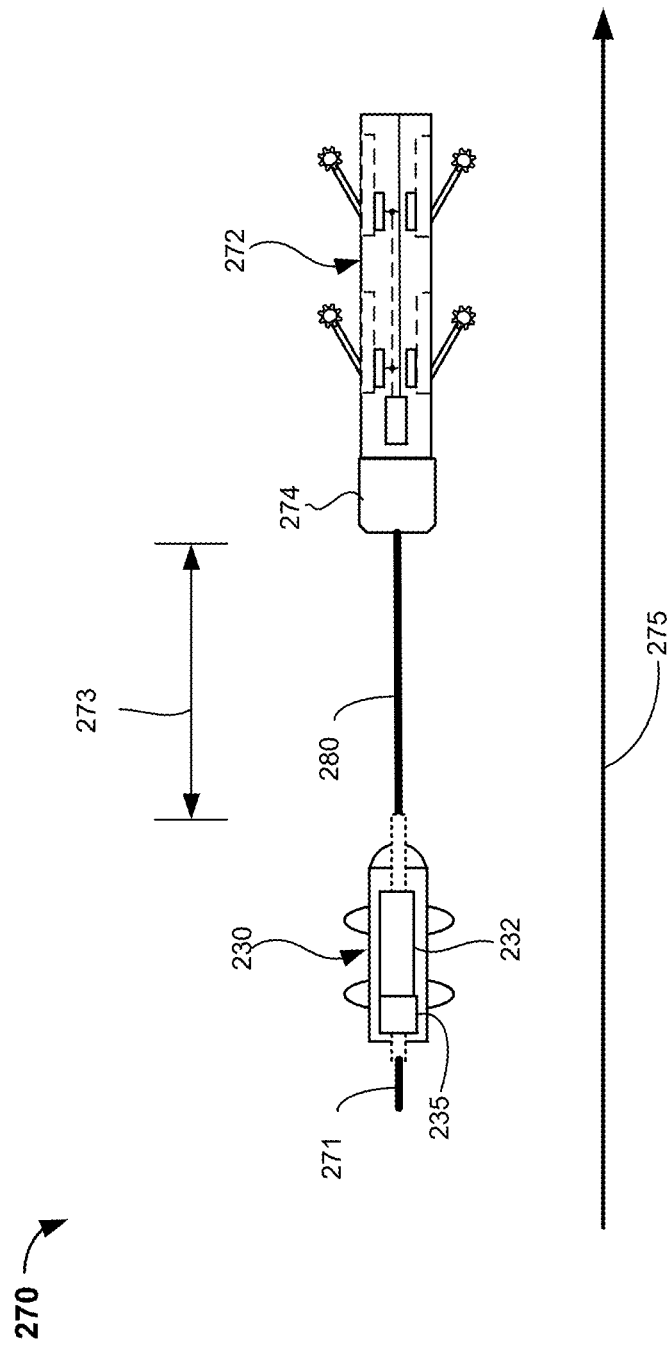
FIG. 2E illustrates a logging apparatus having the logging tool positioned uphole of a tractor in accordance with various embodiments.

FIG. 2E illustrates a logging apparatus 270 having the logging tool positioned uphole of a downhole tractor in accordance with various embodiments. As shown in FIG. 2E, a logging tool 230 is positioned uphole relative to a tractor 272. A pulled cable 271 is coupled to the logging tool 230, wherein the logging tool is then coupled to an extendible and retractable umbilical cord 280. The pulled cable 271 extends from the logging tool 230 to a power source in a same or similar manner as described above with respect to cable 261 (FIG. 2D). In FIG. 2E the umbilical cord 280 is coupled to the logging tool 230 and the downhole tractor 272 using a cable mechanism 274 configured to allow the pulling force of the tractor 272 to move both the tractor 272 and the logging tool 230 in a direction illustratively indicated by arrow 275 through a wellbore. The cable mechanism 274 may be configured to extend and retract the length of cable extending between the logging tool 230 and the tractor 272, thereby changing the distance 273 between the logging tool and the tractor while allowing the logging tool to be moved through the wellbore at a different rate of speed than the tractor is moving through the wellbore, all while maintaining the electrical and communication links between the logging tool and the tractor. This ability to decouple the speed of the logging tool 230 moving through the wellbore relative to the speed of the tractor 272 moving through the wellbore provides the advantages of being able to speed up and slow down the rate of movement of the logging devices 232 as described above.

Figure 3:
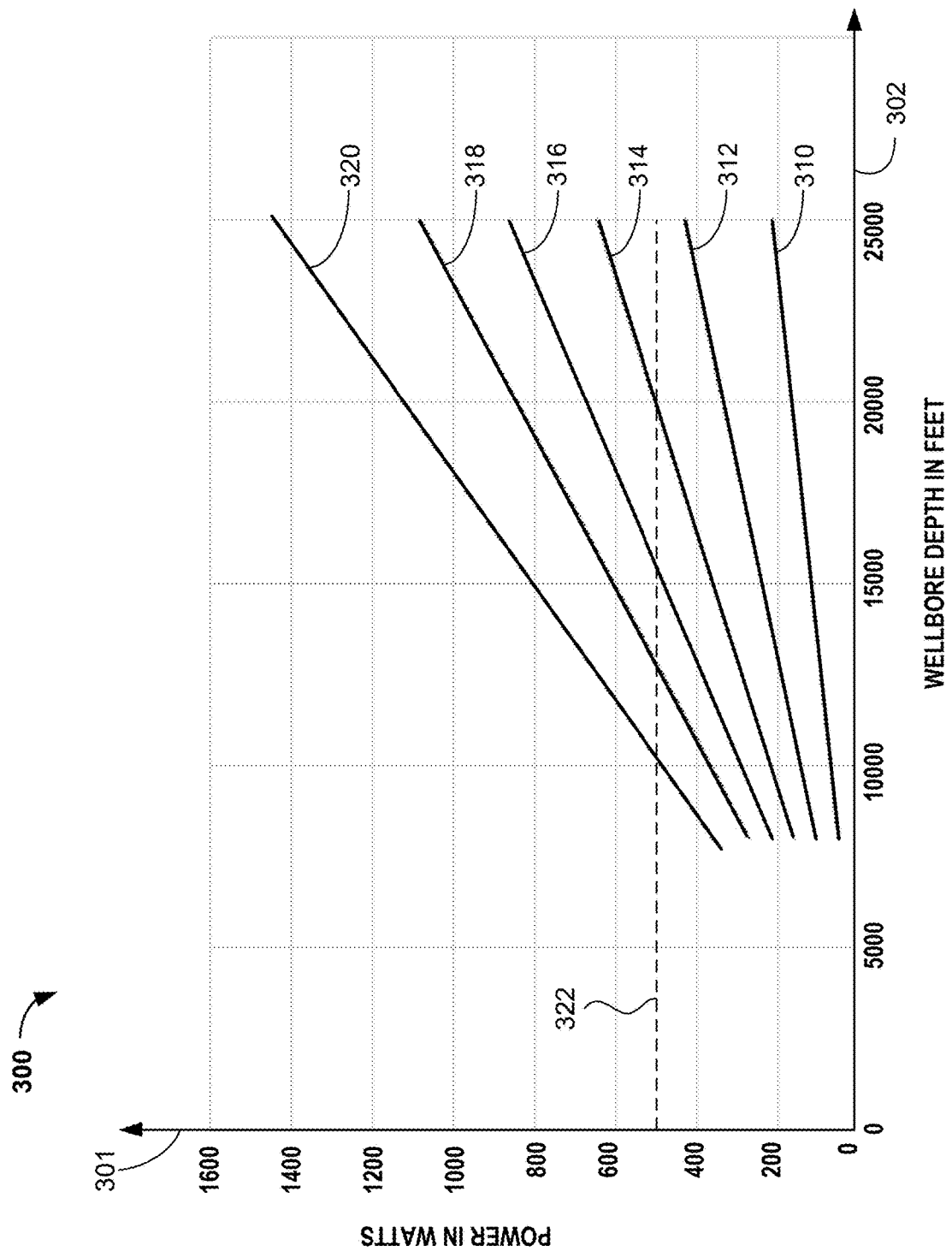
FIG. 3 illustrates a graph showing various power level requirements needed to pull a cable and move logging tools within a wellbore at various rates in accordance with various embodiments.

FIG. 3 illustrates a graph 300 showing various power level requirements needed to pull a cable and move logging tools within a wellbore at various rates in accordance with various embodiments. Graph 300 includes a vertical axis 301 indicative of power in Watts, and a horizontal axis 302 representative of a wellbore depth in feet. Wellbore depth in feet as depicted by horizontal axis 302 does not refer to the depth below a surface or a wellhead within a wellbore system, but refer to the overall length of a cable extending from the surface or the wellhead of a wellbore system to the distal end of the cable, which is attached to a tractor being used to pull the cable and move a set of logging tools through the wellbore. Each of graphical lines 310, 312, 314, 316, 318, and 320 represent the level of power, in Watts, required to drag a cable at the range of wellbore depths depicted by horizontal axis 302 at a respective constant rate of speed in a lateral direction through the wellbore. The indications of the required power are based on pulling an Ecoseal cable having a friction coefficient of 0.2 through an ERD well having an 800 foot (243 meter) vertical wellbore coupled to a 17000 foot (5182 meter) horizonal wellbore and 800 pounds (362.9 kilograms) of tools.

Graphical line 310 represents the power requirements needed to pull the cable and move the logging tools along from the beginning of the horizontal wellbore (800 foot depth level) to the end of the horizontal wellbore (25000 foot depth level) at a constant rate of 15 feet/minute. At the 800 foot depth level the power requirement needed to achieve the 15 feet/minute rate is below 100 watts, and increases at a linear rate to just over 200 Watts by the time the tractor reaches the 17000 foot depth level.

Graphical line 312 represents the power requirements needed to pull the cable and move the logging tools along from the beginning of the horizontal wellbore (800 foot depth level) to the end of the horizontal wellbore (25000 foot depth level) at a constant rate of 30 feet/minute. At the 800 foot depth level the power requirement needed to achieve the 30 feet/minute rate is approximately 150 watts, and increases at a linear rate to just over 400 Watts by the time the tractor reaches the 17000 foot depth level.

Graphical line 314 represents the power requirements needed to pull the cable and move the logging tools along from the beginning of the horizontal wellbore (800 foot depth level) to the end of the horizontal wellbore (25000 foot depth level) at a constant rate of 45 feet/minute. At the 800 foot depth level the power requirement needed to achieve the 45 feet/minute rate is below 200 watts, and increases at a linear rate to just over 600 Watts by the time the tractor reaches the 17000 foot depth level.

Graphical line 316 represents the power requirements needed to pull the cable and move the logging tools along from the beginning of the horizontal wellbore (800 foot depth level) to the end of the horizontal wellbore (25000 foot depth level) at a constant rate of 60 feet/minute. At the 800 foot depth level the power requirement needed to achieve the 60 feet/minute rate is just over 200 watts, and increases at a linear rate to over 800 Watts by the time the tractor reaches the 17000 foot depth level.

Graphical line 318 represents the power requirements needed to pull the cable and move the logging tools along from the beginning of the horizontal wellbore (800 foot depth level) to the end of the horizontal wellbore (25000 foot depth level) at a constant rate of 75 feet/minute. At the 800 foot depth level the power requirement needed to achieve the 75 feet/minute rate is approximately 300 watts, and increases at a linear rate to just under 1100 Watts by the time the tractor reaches the 17000 foot depth level.

Graphical line 320 represents the power requirements needed to pull the cable and move the logging tools along from the beginning of the horizontal wellbore (800 foot depth level) to the end of the horizontal wellbore (25000 foot depth level) at a constant rate of 100 feet/minute. At the 800 foot depth level the power requirement needed to achieve the 100 feet/minute rate is approximately 350 watts, and increases at a linear rate to just over 1400 Watts by the time the tractor reaches the 17000 foot depth level.

As shown in graph 300, for any given rate of speed utilized to pull the cable and move the logging tool through the entirety of the horizontal wellbore, an increasing larger level of power is needed as the depth of the pulled cable and the logging tool increases. However, if a tractor used to pull the cable and move the logging tools as depicted in graph 300 has a maximum operating power level, one or more of the higher rates of travel though the wellbore may not be achievable, at least for the entirety of the horizontal portion of the wellbore. Using a 500 Watt maximum power level as an illustrative example and as represented by dashed line 322 in graph 300 as illustrative, graph 300 shows that only graphical line 310 representing a 15 foot/minute rate of movement and graphical line 312 representing a 30 foot/minute rate of movement are rates that are maintainable over the entirety of the 800 foot to 17000 foot wellbore depths. The rates of movement represented by graphical lines 314, 316, 318, and 320 cannot be maintained, at least not over the entirety of the length of the wellbore between 800 foot and 17000 foot depths, using a tractor having a maximum power rating of 500 Watts. As such, only the lower rates of speed of moving through the entirety of the wellbore may be achieved using the 500 Watt rated tractor, which as described above, may not provide optimal speeds, and thus may not provide optimal rates of fluid flows passing over the logging tool regarding fluid flow measurements being taken by the logging tool being moved through the horizontal portion of the wellbore.

However, by using the apparatus, methods, and techniques described above to extend the logging tool away from the tractor, at least for some period, the effective rate of movement of the logging tool can be increased, allowing for more accurate measurements of the flow of fluid through the horizonal portion of the wellbore while still utilizing a tractor having a maximum power rating that provides an overall rate of movement that is less than the effective rate of movement of the logging tool achievable when operating the actuator coupling the tractor to the logging tool as described for example withs respect to FIGS. 1 and 2A-2E.

Figure 4:
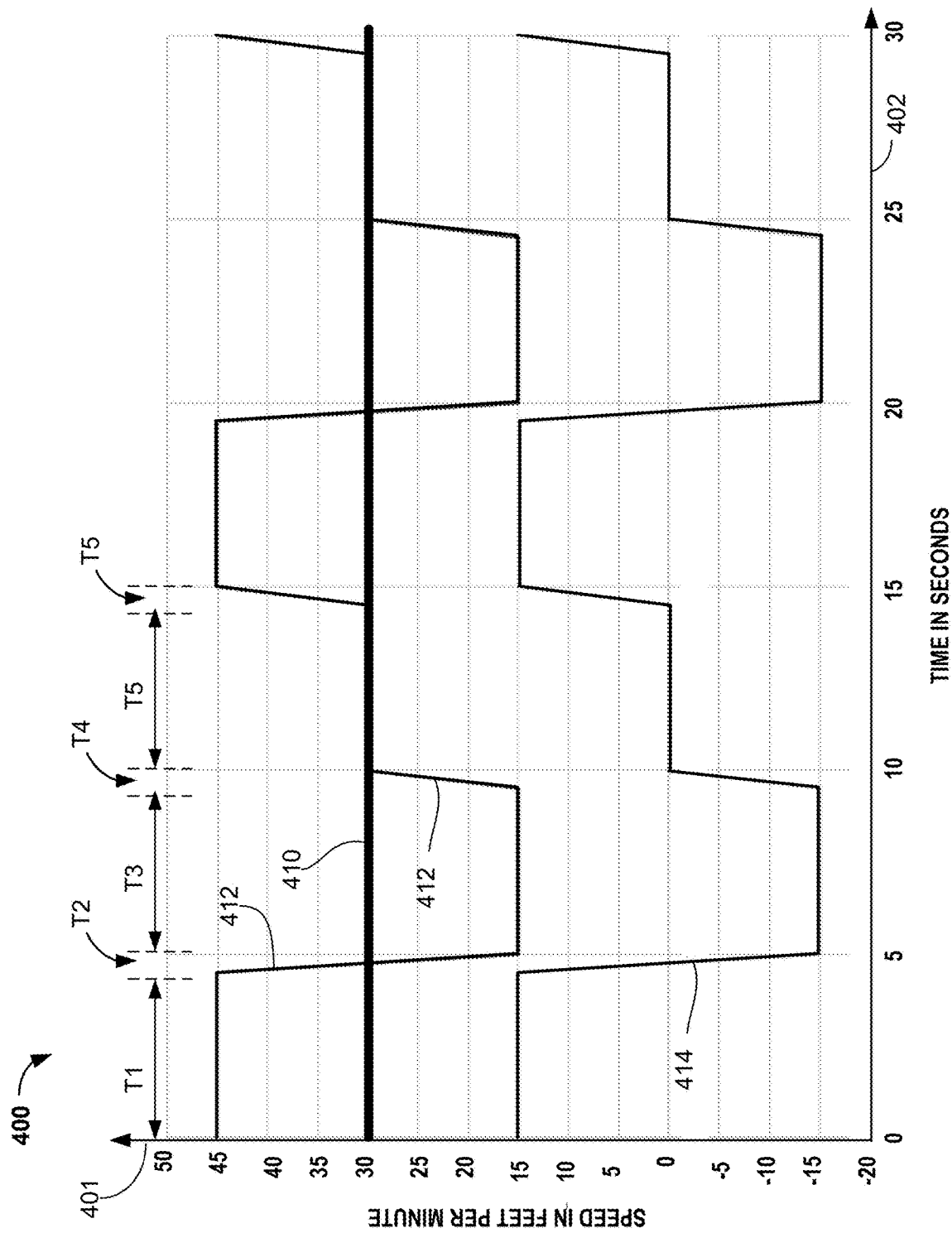
FIG. 4 illustrates a graph showing various rates of speed of movement of parts of a logging apparatus in accordance with various embodiments.

FIG. 4 illustrates a graph 400 showing various rates of speed of movement of parts of a logging apparatus in accordance with various embodiments. Graph 400 includes a vertical axis 401 indicative of speed in feet per minute, and a horizontal axis 402 representative of time in seconds. The graphical lines 410, 412, and 414 represent illustrative and non-limiting examples of the variations in speeds for parts of a logging apparatus, such as logging apparatus 140 (FIG. 1)

including a downhole tractor, a logging tool, and an actuator (e.g., a positioning mechanism), which is mechanically coupling the logging tool to the tractor as the logging apparatus moves through a wellbore, such as a lateral wellbore 126 of FIG. 1.

In graph 400, horizontal line 410 represents a rate of speed of the movement of the tractor portion of the logging apparatus through the wellbore. As represented in graph 400, the rate of speed of movement of the tractor is constant at 30 feet per minute measured relative to the wellbore casing through which the logging apparatus is moving. Graphical line 412 represents the variations in the speed of movement of a logging tool comprising one or more spinners as measured relative to the wellbore casing through which the logging apparatus is moving. Graphical line 414 represents the variations in the speed and the direction of movement of the actuator coupling the logging tool to the tractor, the speed and direction of movement of the actuator relative to the speed and direction of movement of the tractor.

As illustrated in graph 400, throughout the time periods indicated as T1, T2, T3, T4, and T5 the direction of movement and the speed of movement of the tractor relative to the casing of the wellbore remains constant at a rate of 30 feet per minute. During the time period depicted as time period T1, the speed of the actuator coupling the logging tool to the tractor is a positive 15 feet per minute over the speed of the tractor and moving in the same direction as the direction of movement of the tractor, thereby resulting in an speed of 45 feet per minutes for the logging tool relative to the casing of the wellbore (30 feet per minute based on the movement of the tractor plus the added 15 feet per minute resulting from the extension movement of the actuator). At the end of time period T1, the actuator has reached the end of the actuator's physical extension range, and therefore cannot continue to advance the logging tool away from the tractor at the rate of 15 feet per minute.

During the time period T2 the direction of movement of the actuator is reversed, the actuator changing from an extending motion that moves the logging tool away from the tractor to a retraction motion that moves the logging tool back toward the tractor. During the time period depicted as time period T3, the speed of the actuator coupling the logging tool to the tractor is a negative 15 feet per minute relative to the speed of the tractor and moving in the opposite direction as the direction of movement of the tractor, thereby resulting in a speed of 15 feet per minute for the logging tool relative to the casing of the wellbore (30 feet per minute base on the movement of the tractor minus the 15 feet per minute resulting from the retraction of the actuator) and thereby resulting in the logging tool moving back in a direction toward the tractor. At the end of time period T3, the actuator has reached a retracted position, and therefore cannot continue to retract the logging tool toward the tractor at the rate of 15 feet per minute.

During the time period T4 the retraction movement of the actuator is reduced to a rate of zero feet per minute and remains at that zero rate as shown by graphical line 414 over the time period indicated as T5 in graph 400. At the end of time period T5, the actuator may again begin to extend away from the tractor, resulting in a buildup in the speed of the logging tool relative to the casing of the wellbore to a rate of positive 15 feet per minute, which by again being maintained for a period of time similar to that of time period T1, results in the added rate of speed of the logging tool relative to the casing. The cycle of actuator extension and retraction as represented as occurring over time periods T1-T5 may be repeated any number of times as the tractor continued to advance through the wellbore at a constant rate of speed as illustratively indicated by line 410 in graph 400.

By synchronizing the fluid flow rate measurements taken by the spinner(s) of the logging tool with time period T1 wherein the movement of the logging tool is increased relate to the casing of the wellbore, and thus may be increased relate to a flow rate of fluid moving through the casing, a more accurate measurement of the fluid flow rate may be achieved, at least for measurements taken during the time period such as time period T1.

In the alternative and when the logging tool consists of logging devices such as sonic or pulsed neutron logging tools, the period illustratively shown as T3 in graph 400 results in a rate of movement of the logging tool relate to the casing of the wellbore that is less than the rate of movement of the tractor relative to the casing. The effect is that the logging tool during time period T3 is positioned over a portion of the casing for a longer period of time as would be provided if the logging tool were moving at the same rate as the tractor. The slowing rate of movement of the logging tool may allow for the gathering of more data points relative to the transmission and receipt of logging signal transmitted from the logging tool and into the case and/or the formation proximate the casing where the logging tool is operating, which in turn may allow for more accurate data to be collected for portions of the casing and/or for portions of the formation.

Figure 5:
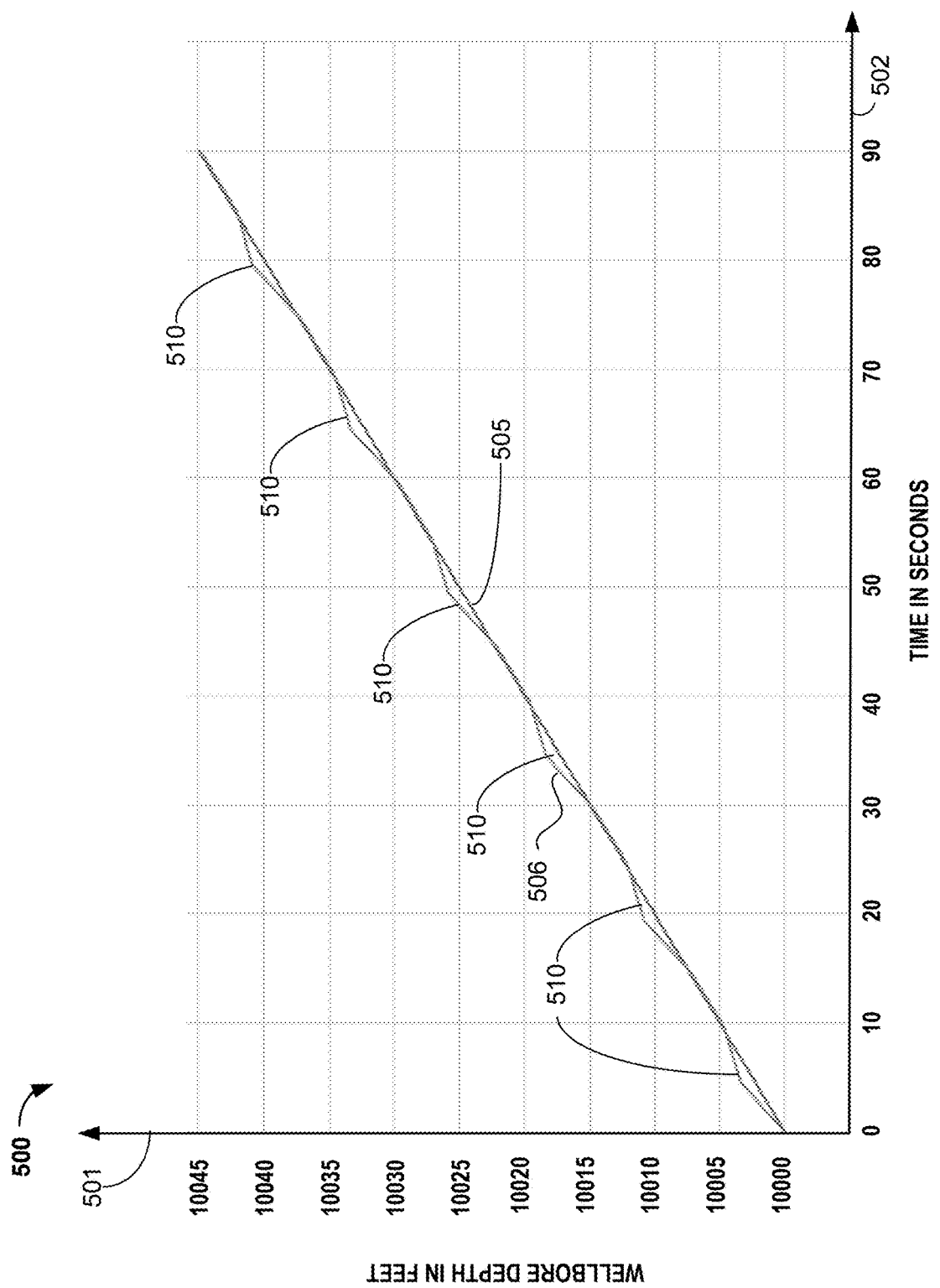
FIG. 5 illustrates a graph comparing relative depths of a downhole tractor and a logging tool coupled to the tractor in accordance with various embodiments.

FIG. 5 illustrates a graph 500 comparing relative depths of a downhole tractor and a logging tool coupled to the tractor in accordance with various embodiments. Graph 500 includes a vertical axis 501 indicative of a depth within a wellbore system in feet as defined by the distance between the wellhead and a route taken through one or more wellbores to a point within the wellbore system. Graph 500 includes a horizontal axis 502 representing time in seconds. Graphical line 505 represents the depth of a tractor over a range of time as the tractor moves through a wellbore. Graphical line 506 represents the position of a logging tool coupled to the tractor over time as the logging tool moves through the wellbore.

As illustrated by the linearity of graphical line 505, the positions of the tractor within the wellbore, and thus the speed of the tractor's movement though the wellbore, is constant over time. However, the position of the logging tool relative to the tractor varies, as indicated by "bumps" 510 in graphical line 506. These bumps 510 show that at times the position of the logging tool is deeper within the wellbore and increases relative to the position of the tractor, which is due for example the extending of a positioning mechanism coupling the logging tool to the tractor, and thus moving the logging tool to a position deeper within the wellbore. Bumps 510 also show that after the logging tool is positioned deeper in the wellbore compared to the tractor, the logging tool is then pulled back so that the distance between the logging tool and the tractor is reduced. This reduction in the difference between the depth of the logging tool and the depth of the tractor within the wellbore in some examples is due to the retraction of the positioning mechanism that couples the logging tool to the tractor. As shown in graph 500, this extension and retraction process is repeated over time, resulting in the sequence of bumps 510 occurring over time as illustrated in graph 500.

Figure 6:
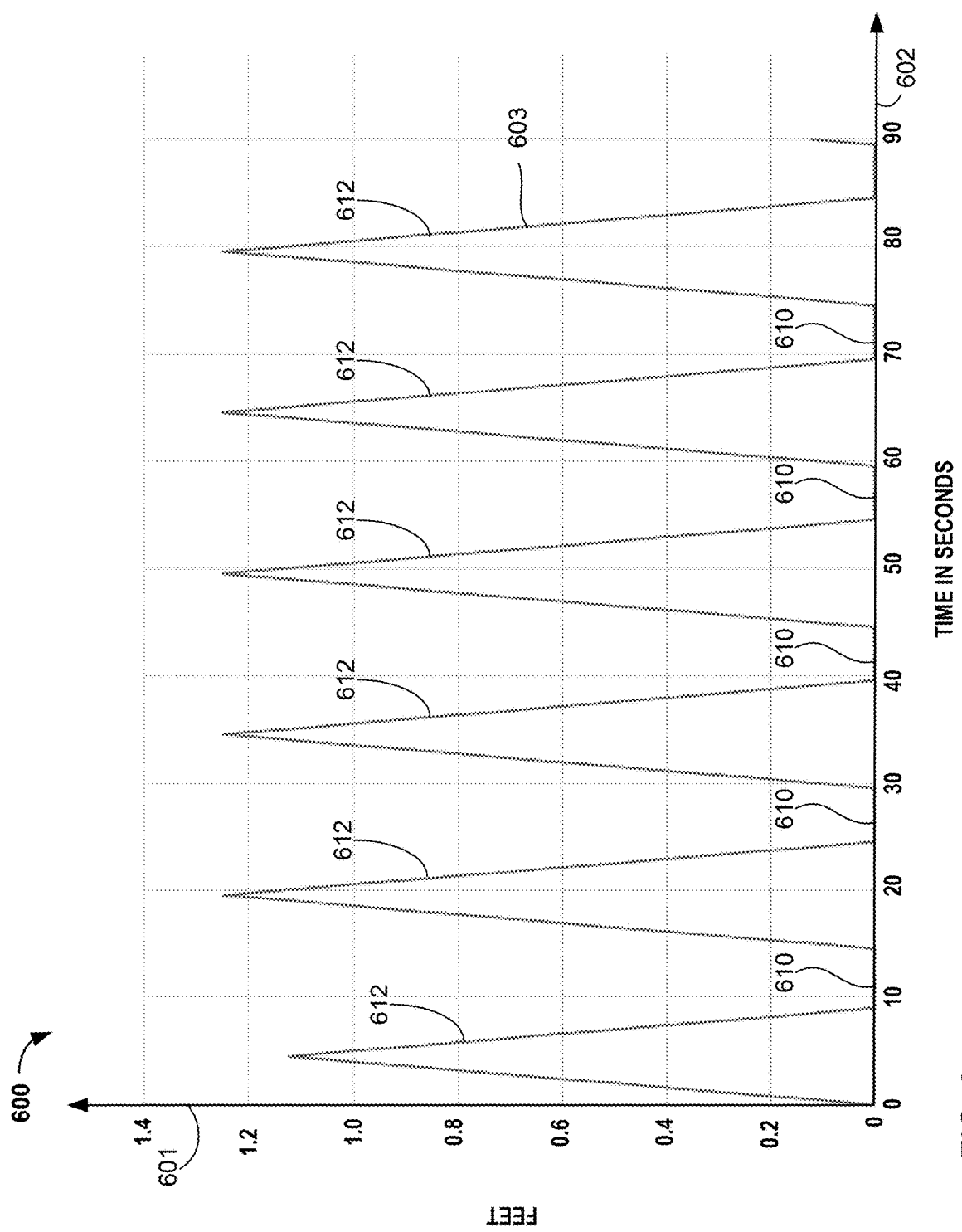
FIG. 6 illustrates a graph of positioning mechanism movements over time in accordance with various embodiments.

FIG. 6 illustrates a graph of positioning mechanism movements over time in accordance with various embodiments. Graph 600 includes a vertical axis 601 indicative the distance of movements of a positioning mechanism in feet, such as positioning mechanism 244 (FIGS. 2A, 2B), over time. Graph 600 includes a vertical axis 601 representing a distance of movement in feet caused by the extension and retraction of the positing mechanism. Graph 600 includes a horizontal axis 602 representing time in seconds. Graphical line 603 indicates the movement in feet of the positioning mechanism over time, including a sequential series of extensions and subsequent retractions of the positioning mechanism, resulting in the triangular shaped curves 612. During periods of time when the positioning mechanism was fully retracted and not moving, graphical line 603 extends horizontally at a zero foot level represented by the horizontal sections 610 of the graphical line.

Figure 7:
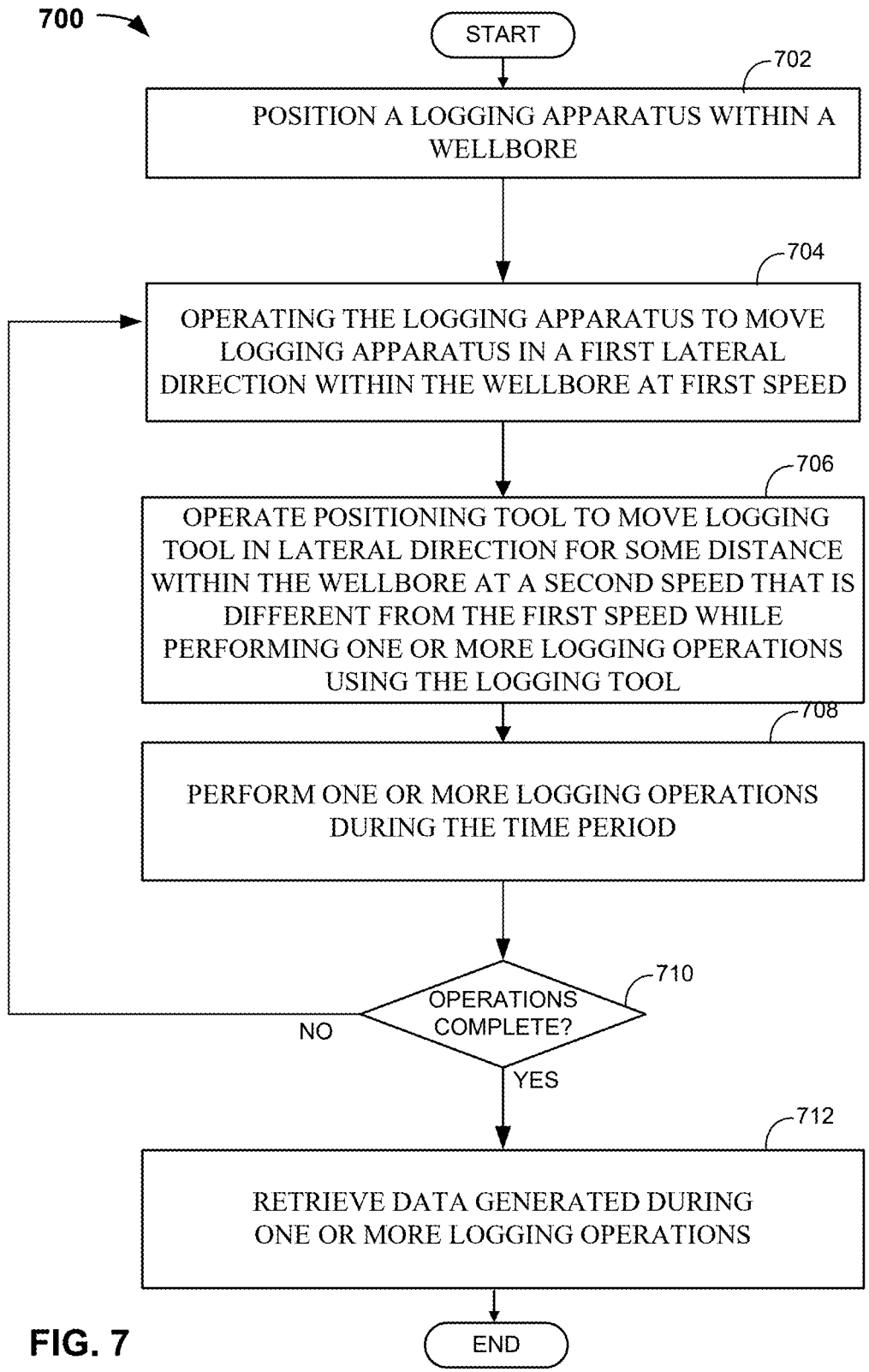
FIG. 7 illustrates a flowchart of a method of wellbore logging in accordance with various embodiments.

FIG. 7 illustrates a flowchart of one or more methods 700 according to various embodiments. Embodiments of method 700 may be performed by a logging apparatus, such as logging apparatus 140, 200, 250, 260, or 270, as illustrated and described above with respect to FIGS. 1 and 2A-2E.

In various embodiments, method 700 includes positioning a logging apparatus within a wellbore (block 702). Positioning the logging apparatus within a wellbore may include positioning the logging apparatus within a non-vertical portion of the wellbore, such as but not limited to a horizontal wellbore, wherein movement of the logging apparatus is performed by operating of one or more downhole tractors.

In various embodiment, method 700 includes operating the logging apparatus to move the logging apparatus in a lateral direction within the wellbore (block 704). In various embodiments, moving the logging apparatus includes operating a downhole tractor by engaging a set of arms and rotary wheels with the casing of the wellbore and powering the rotation of the wheels to move the logging apparatus laterally through the wellbore relative to the casing.

In various embodiments, method 700 includes while operating the tractor to move the logging apparatus in a lateral direction within the wellbore at a first speed, operating a positioning mechanism that is coupling one or more logging devices to the downhole tractor to extend or to retract and thereby move the logging tools at a second speed, at least for some duration of time, through the casing and at a speed that is different from the rate of speed of movement of the downhole tractor (block 706).

In various embodiments, method 700 includes performing one or more logging operations, during the time period when the logging tool is moving at a different rate of speed relative to the casing compared to the rate of speed of movement of the downhole tractor relative to the casing (block 708). In various embodiments, the one or more logging operations include measuring a rate of fluid flow that is flowing past the logging tool while the logging tools is being extended away from the downhole tractor by the positioning mechanism coupling the logging tool to the tractor. In various embodiments, the one or more logging operations include transmitting and receiving signals, such as but not limited to sonic and/or pulsed neutron signals while the logging tool is being retracted back toward the downhole tractor by the positioning mechanism coupling the logging tool to the tractor.

In various embodiments, method 700 includes determining whether the login operations have been completed (decision block 710). If a determination is made that the logging operations are not completed, (the "NO" branch extending from decision block 710), embodiments of method return to block 704. If a determination is made that the logging operations are completed (the "YES" branch extending from decision block 710), embodiment of method 700 may proceed to retrieve data generated during the one or more logging operations (block 712).

Figure 8:
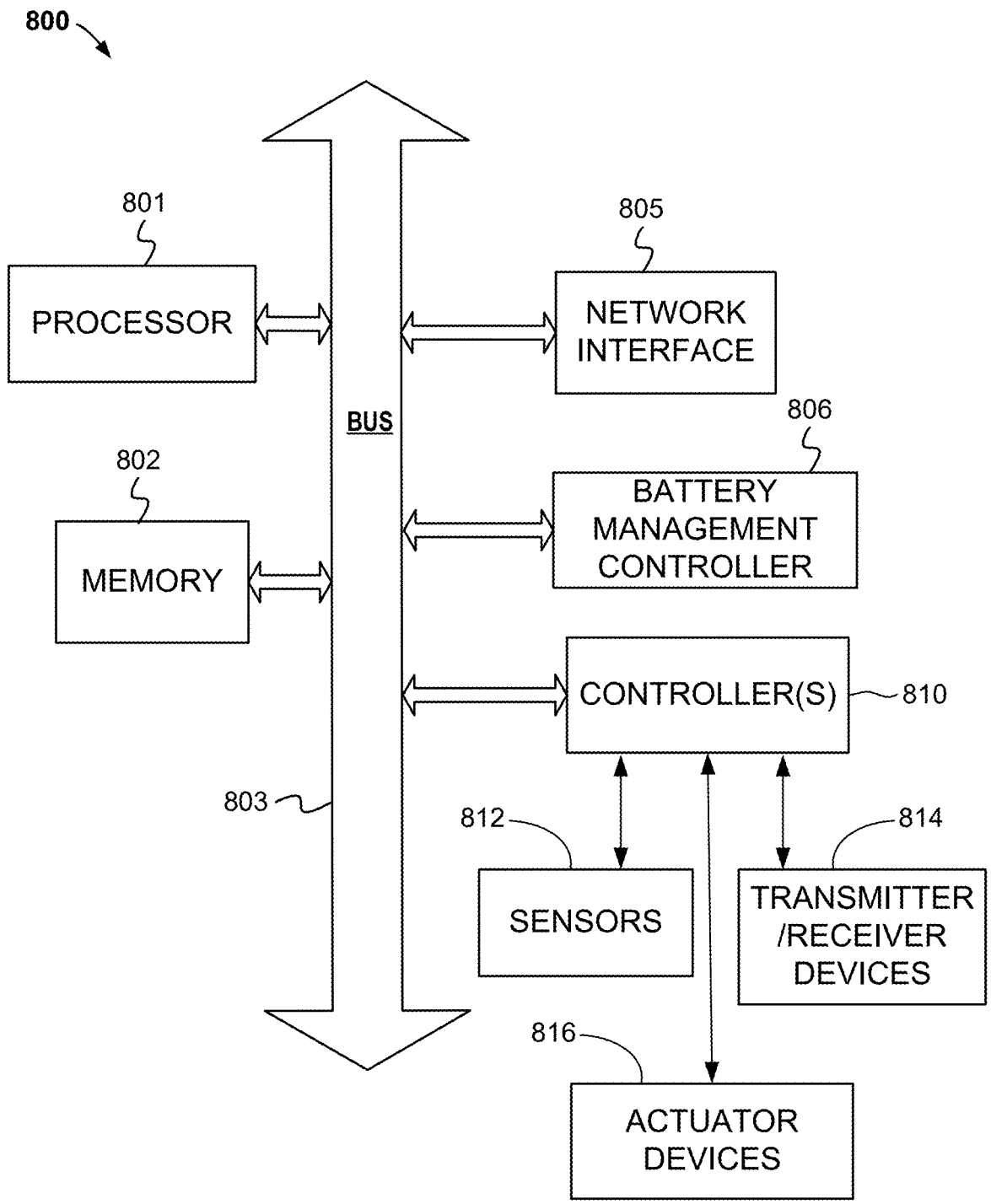
FIG. 8 illustrates a block diagram of an example computer system that may be employed to practice the concepts, methods, and techniques as disclosed herein, and variations thereof.

FIG. 8 illustrates a block diagram of an example computer system 800 that may be employed to practice the concepts, methods, and techniques as disclosed herein, and variations thereof. Embodiment of computer system 800 may be utilized as one or more of the controllers 810 included in the systems and logging apparatus as described herein, including controller(s) such as controller 216 of tractor 210, controller 221 of positioning tool 220, and/or controller 235 of the logging tool 230 (see FIG. 2A-2B).

Computer system 800 includes a plurality of components of the system that are in electrical communication with each other, in some examples using a bus 803. Embodiments of computing system 800 may include any suitable computer, micro-controller, or data processing apparatus capable of being programmed to carry out the methods and for controlling apparatus as described herein. In various embodiments, one or more components illustrated and described with respect to computer system 800 may be included in computer system 152 as illustrated and described above with respect to FIG. 1, and/or as illustrated as any of controllers 216, 221, and 235 as included in FIGS. 2A-2E.

Referring back to FIG. 8, computer system 800 may be a general-purpose computer, and includes a processor 801 (possibly including multiple processors, multiple cores, multiple nodes, and/or implementing multi-threading, etc.). The computer system 800 includes memory 802. Memory 802 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the possible realizations of machine-readable media configured to store data and/or program instructions in an electronic format. The computer system 800 also includes the bus 803 (e.g., PCI, ISA, PCI-Express, HyperTransport® bus, InfiniBand® bus, NuBus, etc.) and a network interface 805 (e.g., a Fiber Channel interface, an Ethernet interface, an internet small computer system interface, SONET interface, wireless interface, etc.). Bus 803 may be configured to provide communications between any of the devices included in computer system 800. As illustrated in FIG. 8, the processor 801 and the network interface 805 are coupled to the bus 803.

Although illustrated as also being coupled to the bus 803, the memory 802 may be coupled to the processor 801 only, or both processor 801 and bus 803. In some examples, memory 802 includes non-volatile memory and can be a hard disk or other types of computer readable media which can store data and program instructions that are accessible by a computer, such as magnetic cassettes, flash memory cards, solid state memory devices, digital versatile disks (DVDs), cartridges, RAM, ROM, a cable containing a bit stream, and hybrids thereof. Network interface 805 may be configured to provide communications between computer system 800 and other computing devices, such as one or more remote computing system(s) located away from the site of the wellbore.

Embodiments of computing system 800 include one or more controllers 810. Controllers 810 may be physically located within a device of a logging apparatus and configured to control the specific operation(s) that are being performed by that particular part of the logging apparatus. For example, a controller 810 may be located in a tractor portion of a logging apparatus, and be configured to control the operation of the tractor, including control over the extension of any arms and rotary wheels included as part of the propulsion system of the tractor, and thereby controlling the speed of movement to the tractor through a wellbore. A controller 810 may be located in a positioning tool of a logging apparatus, and configured to control the operation of a positioning mechanism coupled to a logging tools, including control over the rate(s) of speed of the extension and retraction of the positioning mechanism. One or more controllers 810 may be located in the logging tools of the logging apparatus, and configured to control the operation of the logging devices included in the logging tool, including data processing functions associated with any signals received from one or more sensors located in and associated with the logging devices, such as spinners, sonic logging tools, and/or neutron logging tools. Various types of logging tools may include transmitter/receiver devices 814, which may be configured to transmit signals from the logging device(s) and to receive signals back at one or more receiving devices that are coupled to and operate under the control of a controller 810 as part of a wellbore logging operations. In addition, one or more of sensors 812 and one or more actuator devices 816 may be coupled to and operate under the control of one or more or controllers 810. For example, actuator devices 816 may include devices configured to activate the arms and rotate the wheels associated with the propulsion of the downhole tractor(s), and/or to control an actuator of the positioning devices configured to extend and retract the positioning mechanism included in the logging apparatus and which couples the logging tools to the downhole tractor.

Embodiments of computer system 800 include a battery management controller 806. In various embodiments, battery management controller 806 is configured to control the operation of a battery and/or battery powered equipment, such as battery 267 and the battery powered logging apparatus as illustrated and described with respect to FIG. 2D. In various embodiments, computer system 800 as illustrated in FIG. 8 includes the network interface 805 configured to provide communication with other computer systems and controllers that may be coupled to computer system 800.

It will be understood that one or more blocks of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus. As will be appreciated, aspects of the disclosure may be embodied as a system, method or program code/instructions stored in one or more non-transitory machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine. While depicted as a computing system 1400 or as a general purpose computer, some embodiments can be any type of device or apparatus to perform operations described herein.

As will be appreciated, aspects of the disclosure may be embodied as a system, method or program code/instructions stored in one or more non-transitory machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, which employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

While the aspects of the disclosure are described with reference to various implementations and exploitations, it will be understood that these aspects are illustrative and that the scope of the claims is not limited to them. In general, techniques for monitoring fluid injection procedures as described herein may be implemented with facilities consistent with any hardware system or hardware/software systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Non-limiting example embodiments include the following:

Embodiment 1. A system comprising: a logging apparatus configured to be positioned downhole within a wellbore and to perform one or more logging operations within the wellbore, the logging apparatus including a downhole tractor and one or more logging tools mechanically coupled to the downhole tractor by a positioning mechanism, wherein the downhole tractor is configured to propel the logging apparatus in a lateral direction through the wellbore at a first speed, and wherein the positioning mechanism is configured to move the logging tool laterally for a distance within the wellbore and at a second speed that is different from the first speed while the downhole tractor is operating to move in the lateral direction at the first speed and while the one or more logging tools perform the one or more logging operations within the wellbore.

Embodiment 2. The system of embodiment 1, wherein the positioning mechanism is configured to be extendible from a retracted position to increase a lateral distance between the downhole tractor and the one or more logging tools while the downhole tractor is operating to move in the lateral direction at the first speed and while the one or more logging tools perform the one or more logging operations within the wellbore.

Embodiment 3. The system of embodiment 1, wherein the lateral direction is a downhole direction, and wherein the positioning mechanism is configured to extend over the distance within the wellbore at a second speed that is greater than the first speed of the downhole tractor in order to increase a relative rate of movement for the one or more logging tools relative to a casing of the wellbore.

Embodiment 4. The system of any one of embodiments 1-3, wherein the one or more logging tools includes one or more spinners configured to measure a rate of fluid flow within the wellbore and flowing by the one or more logging tools.

Embodiment 5. The system of any one of embodiments 1-3, wherein the one or more logging tools includes a pulsed neutron logging tool.

Embodiment 6. The system of any one of embodiments 1-5, wherein the downhole tractor is configured to be coupled to a pull cable, the downhole tractor configured to pull the pull cable along through the wellbore as the downhole tractor advances through the wellbore, and wherein the pull cable is configured to couple electrical power from a power sources located above a surface of the wellbore to the downhole tractor.

Embodiment 7. The system of any one of embodiments 1-6, wherein the logging apparatus includes one or more controllers configured to communicate, in real time, data generated by the logging tools to one or more computer devices located at a surface above the wellbore.

Embodiment 8. The system of any one of embodiments 1 or 4-7, wherein the positioning mechanism is configured to be retractable from an extended position in order to decrease a lateral distance between the downhole tractor and the one or more logging tools while the downhole tractor is operating to move in the lateral direction at the first speed and while the one or more logging tools perform the one or more logging operations within the wellbore.

Embodiment 9. The system of any one of embodiments 1 or 4-8, wherein the positioning mechanism is configured to be extendible from a contracted position in order to increase a lateral distance between the downhole tractor and the one or more logging tools while the downhole tractor is operating to move in the lateral direction at the first speed and while the one or more logging tools perform the one or more logging operations within the wellbore.

Embodiment 10. The system of any one of embodiments 1-9, wherein the downhole tractor is configured to move through the wellbore at a rate in a range from 0 to 150 feet per minute, (0 to 0.762 meters per second), inclusive.

Embodiment 11. The system of any one of embodiments 1-10, wherein the positioning mechanism is configured to extend and to contract at a rate in a range of from 0 to 30 feet per minute, (0 to 0.1524 meters per second), inclusive.

Embodiment 12. A system comprising: a first downhole tractor and a second downhole tractor, the first downhole tractor configured to be positioned uphole from the second downhole tractor within a wellbore and to pull a cable coupled to the first downhole tractor through the wellbore, the second downhole tractor including a logging tool comprising one or more well logging devices, the logging tool coupled to the second downhole tractor by a positioning mechanism configured to extend to position the logging tool away from the second downhole tractor and to contract to move the logging tool closer to the second downhole tractor, the logging tool configured to perform one or more logging operations while downhole and while being moved relative to the position of the second downhole tractor by the positioning mechanism.

Embodiment 13. The system of embodiment 12, wherein the first downhole tractor is coupled to the second downhole tractor by an extendible and retractable umbilical cord.

Embodiment 14. The system of embodiment 12, wherein the second downhole tractor is powered by a battery incorporated into the second downhole tractor, and is configured to move through the wellbore independently of the first downhole tractor and at different speeds compared to a speed of movement of the first downhole tractor using power provided to the second downhole tractor by the battery.

Embodiment 15. The system of any one of embodiments 12-15, wherein the first downhole tractor is configured to be powered by electrical power provided to the first downhole tractor by a pulled cable coupled to the first downhole tractor and to an electrical power supply, and wherein the second downhole tractor is configured to be releasably latchable to the first downhole tractor in order to recharge a battery located in the second downhole tractor using electrical power provide by the first downhole tractor.

Embodiment 16. A method comprising: positioning a logging apparatus downhole within a wellbore, the logging apparatus including a downhole tractor coupled to one or more logging tools through a positioning mechanism; operating the downhole tractor to move the downhole tractor in a first lateral direction within the wellbore at a first speed; and while operating the downhole tractor to move the downhole tractor in the first lateral direction, operating the positioning mechanism to move the one or more logging tools in the first lateral direction for a distance within the wellbore and at a second speed that is different from the first speed while performing one or more logging operations using the one or more logging tools.

Embodiment 17. The method of embodiment 16, further including operating the positioning mechanism from a retracted position to an extended to increase a lateral distance between the downhole tractor and the one or more logging tools while the downhole tractor is operating to move in the first lateral direction at the first speed and while the one or more logging tools perform the one or more logging operations within the wellbore.

Embodiment 18. The method of embodiment 16, wherein the first lateral direction is a downhole direction, and wherein the positioning mechanism is configured to extend over the distance within the wellbore at a second speed that is greater than the first speed of the downhole tractor in order to increase a relative rate of movement for the one or more logging tools relative to a casing of the wellbore.

Embodiment 19. The method of any one of embodiments 16-18, wherein the one or more logging tools includes one or more spinners configured to measure a rate of fluid flow within the wellbore and flowing by the one or more logging tools.

Embodiment 20. The method of any one of embodiments 16-20, wherein the one or more logging tools includes a pulsed neutron logging tool.

What is claimed is:

1. A system, comprising:
   a logging apparatus configured to be positioned downhole within a wellbore and to perform one or more logging operations within the wellbore, the logging apparatus including a downhole tractor and one or more logging tools mechanically coupled to the downhole tractor by a positioning mechanism,
   wherein the downhole tractor is configured to propel the logging apparatus in a lateral direction through the wellbore at a first speed,
   and wherein the positioning mechanism is configured to move the logging tool laterally for a distance within the wellbore and at a second speed that is different from the first speed while the downhole tractor is operating to move in the lateral direction at the first speed and while the one or more logging tools perform the one or more logging operations within the wellbore.

2. The system of claim 1, wherein the positioning mechanism is configured to be extendible from a retracted position to increase a lateral distance between the downhole tractor and the one or more logging tools while the downhole tractor is operating to move in the lateral direction at the first speed and while the one or more logging tools perform the one or more logging operations within the wellbore.

3. The system of claim 1, wherein the lateral direction is a downhole direction, and wherein the positioning mechanism is configured to extend over the distance within the wellbore at a second speed that is greater than the first speed of the downhole tractor in order to increase a relative rate of movement for the one or more logging tools relative to a casing of the wellbore.

4. The system of claim 1, wherein the one or more logging tools includes one or more spinners configured to measure a rate of fluid flow within the wellbore and flowing by the one or more logging tools.

5. The system of claim 1, wherein the one or more logging tools includes a pulsed neutron logging tool.

6. The system of claim 1, wherein the downhole tractor is configured to be coupled to a pull cable, the downhole tractor configured to pull the pull cable along through the wellbore as the downhole tractor advances through the wellbore, and wherein the pull cable is configured to couple electrical power from a power source located above a surface of the wellbore to the downhole tractor.

7. The system of claim 1, wherein the logging apparatus includes one or more controllers configured to communicate, in real time, data generated by the logging tools to one or more computer devices located at a surface above the wellbore.

8. The system of claim 1, wherein the positioning mechanism is configured to be retractable from an extended position in order to decrease a lateral distance between the downhole tractor and the one or more logging tools while the downhole tractor is operating to move in the lateral direction at the first speed and while the one or more logging tools perform the one or more logging operations within the wellbore.

9. The system of claim 1, wherein the positioning mechanism is configured to be extendible from a contracted position in order to increase a lateral distance between the downhole tractor and the one or more logging tools while the downhole tractor is operating to move in the lateral direction at the first speed and while the one or more logging tools perform the one or more logging operations within the wellbore.

10. The system of claim 1, wherein the downhole tractor is configured to move through the wellbore at a rate in a range from 0 to 150 feet per minute, (0 to 0.762 meters per second), inclusive.

11. The system of claim 1, wherein the positioning mechanism is configured to extend and to retract at a rate in a range of from 0 to 30 feet per minute, (0 to 0.1524 meters per second), inclusive.

12. A system comprising:
    A first downhole tractor and a second downhole tractor, the first downhole tractor configured to be positioned uphole from the second downhole tractor within a wellbore and to pull a cable coupled to the first downhole tractor through the wellbore,
    the second downhole tractor including a logging tool comprising one or more well logging devices, the logging tool coupled to the second downhole tractor by a positioning mechanism configured to extend to position the logging tool away from the second downhole tractor and to contract to move the logging tool closer to the second downhole tractor, the logging tool configured to perform one or more logging operations while downhole and while being moved relative to the position of the second downhole tractor by the positioning mechanism.

13. The system of claim 12, wherein the first downhole tractor is coupled to the second downhole tractor by an extendible and retractable umbilical cord.

14. The system of claim 12, wherein the second downhole tractor is powered by a battery incorporated into the second downhole tractor, and is configured to move through the wellbore independently of the first downhole tractor and at different speeds compared to a speed of movement of the first downhole tractor using power provided to the second downhole tractor by the battery.

15. The system of claim 12, wherein the first downhole tractor is configured to be powered by electrical power provided to the first downhole tractor by a pulled cable coupled to the first downhole tractor and to an electrical power supply, and wherein the second downhole tractor is configured to be releasably latchable to the first downhole tractor in order to recharge a battery located in the second downhole tractor using electrical power provided by the first downhole tractor.

16. A method comprising:
    positioning a logging apparatus downhole within a wellbore, the logging apparatus including a downhole tractor coupled to one or more logging tools through a positioning mechanism;
    operating the downhole tractor to move the downhole tractor in a first lateral direction within the wellbore at a first speed; and
    while operating the downhole tractor to move the downhole tractor in the first lateral direction, operating the positioning mechanism to move the one or more logging tools in the first lateral direction for a distance within the wellbore and at a second speed that is different from the first speed while performing one or more logging operations using the one or more logging tools.

17. The method of claim 16, further including operating the positioning mechanism from a retracted position to an extended position to increase a lateral distance between the downhole tractor and the one or more logging tools while the downhole tractor is operating to move in the first lateral direction at the first speed and while the one or more logging tools perform the one or more logging operations within the wellbore.

18. The method of claim 16, wherein the first lateral direction is a downhole direction, and wherein the positioning mechanism is configured to extend over the distance within the wellbore at a second speed that is greater than the first speed of the downhole tractor in order to increase a relative rate of movement for the one or more logging tools relative to a casing of the wellbore.

19. The method of claim 16, wherein the one or more logging tools includes one or more spinners configured to measure a rate of fluid flow within the wellbore and flowing by the one or more logging tools.

20. The method of claim 16, wherein the one or more logging tools includes a pulsed neutron logging tool.

* * * * *